US008274970B2

(12) United States Patent
Bennett et al.

(10) Patent No.: US 8,274,970 B2
(45) Date of Patent: Sep. 25, 2012

(54) VOICE COMMUNICATION DEVICE WITH PSTN AND INTERNET PATHWAY ANALYSIS, SELECTION AND HANDOFF

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 736 days.

(21) Appl. No.: 11/349,292

(22) Filed: Feb. 7, 2006

(65) Prior Publication Data

US 2007/0183402 A1    Aug. 9, 2007

Related U.S. Application Data

(60) Provisional application No. 60/736,889, filed on Nov. 14, 2005.

(51) Int. Cl.
*H04L 12/66* (2006.01)

(52) U.S. Cl. ......... 370/356; 370/345; 370/329; 370/498

(58) Field of Classification Search .................. 370/401, 370/389, 292, 352, 353, 227, 228, 392; 709/231, 709/223, 227, 230, 246
See application file for complete search history.

(56) References Cited

U.S. PATENT DOCUMENTS

| | | | | |
|---|---|---|---|---|
| 6,389,005 | B1 * | 5/2002 | Cruickshank | 370/352 |
| 7,180,898 | B2 * | 2/2007 | Yoshida et al. | 370/395.3 |
| 2002/0010915 | A1 * | 1/2002 | Maeda | 717/11 |
| 2002/0042812 | A1 * | 4/2002 | Spencer | 709/203 |
| 2002/0057672 | A1 | 5/2002 | Komuro | |
| 2002/0065922 | A1 | 5/2002 | Shastri | |
| 2002/0114317 | A1 * | 8/2002 | Dorenbosch et al. | 370/352 |
| 2002/0131604 | A1 * | 9/2002 | Amine | 381/58 |
| 2003/0198218 | A1 * | 10/2003 | Farris et al. | 370/356 |
| 2004/0022235 | A1 | 2/2004 | Vaziri | |
| 2004/0170181 | A1 | 9/2004 | Bogdon et al. | |
| 2005/0025294 | A1 | 2/2005 | Matsuhashi et al. | |
| 2005/0185621 | A1 | 8/2005 | Sivakumar | |
| 2005/0185632 | A1 | 8/2005 | Draves, Jr. et al. | |

(Continued)

FOREIGN PATENT DOCUMENTS

CN    1652560 A    2/2004

(Continued)

OTHER PUBLICATIONS

Partial EP Search Report dated Mar. 31, 2008.

*Primary Examiner* — Hassan Phillips
*Assistant Examiner* — Anez Ebrahim
(74) *Attorney, Agent, or Firm* — Garlick & Markison; Holly L. Rudnick

(57) ABSTRACT

A voice communication device that supports both Internet telephony and public switched telephone network telephony, and maintains the quality of communication. The voice communication device consists of a user interface, a plurality of communication interfaces and a processing circuitry communicatively coupled to the user interface and to the plurality of communication interfaces. The voice communication device maintains quality of service by analyzing the service characteristics of a plurality of communication pathways and determining one communication pathway that compares best in terms of quality of service and cost and transferring to that communication pathway prior to or during the call. Alternatively, a user set service characteristic configurations may also determine the choice of a communication pathway that meets the user requirements of quality of service and cost.

20 Claims, 11 Drawing Sheets

U.S. PATENT DOCUMENTS

2006/0083165 A1* 4/2006 McLane et al. .............. 370/229
2007/0064634 A1* 3/2007 Huotari et al. ............... 370/310

FOREIGN PATENT DOCUMENTS

| | | |
|---|---|---|
| CN | 1592257 A | 4/2004 |
| EP | 0963082 A | 12/1999 |
| EP | 1408651 A | 4/2004 |
| EP | 1511282 A1 | 3/2005 |
| EP | 1517575 A2 | 3/2005 |
| EP | 1589781 A | 10/2005 |
| EP | 1622315 A | 2/2006 |
| WO | WO 00/14919 A | 3/2000 |
| WO | WO 01/35585 A | 5/2001 |
| WO | WO 01/58101 A | 8/2001 |
| WO | 2004023740 A | 3/2004 |
| WO | 2004097594 A | 11/2004 |

* cited by examiner

VOICE COMMUNICATION DEVICE WITH PSTN AND INTERNET PATHWAY ANALYSIS, SELECTION AND HANDOFF

CROSS REFERENCES TO RELATED APPLICATIONS

The present application claims priority to U.S. Provisional Application Ser. No. 60/736,889 filed Nov. 14, 2005, which is incorporated herein by reference in its entirety.

The present application is a related to co-pending Utility application Ser. No. 11/348,632 filed on even date herewith, and entitled "COMMUNICATION DEVICE SUPPORTING BOTH INTERNET AND PUBLIC SWITCHED TELEPHONE NETWORK TELEPHONY," (BP5095).

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

1. Field of the Invention

This invention generally relates to voice communication systems.

2. Related Art

Public switched telephone network and Internet telephony voice communication devices are in wide spread use. A public switched telephone network telephony voice communication device uses a desktop or cordless telephone to make calls to a remote terminal. Further, cell phones utilize cellular networks and public switched telephone network to make calls to distant remote terminals.

Internet voice communication utilizes computers and Internet connections to make calls to remote locations. Internet voice communication devices include a personal or laptop computer, a headset and microphone or stand alone Internet phones. Typically, Internet phones allow the users to make calls to a remote desktop, cordless or cell phone. Today Internet calls are cost effective when compared to a public switched telephone network telephone call, especially, in case of long a distance call.

In Internet telephony, quality of the communication pathway is a concern, especially, when low transfer rate modems are used. When an Internet call becomes inaudible or noisy, the user has to disconnect, i.e., terminate the call, and try again at another time. Similarly, public switched telephone network telephone calls may not provide acceptable voice quality in certain situations such as when calling a remotely located terminal. When experiencing unacceptable voice quality, the user has to terminate the public switched telephone network telephone call and try again with hopes of establishing acceptable quality.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the Claims.

In accordance with the present invention, a voice communication device that maintains quality of service. The voice communication device consists of a user interface, a plurality of communication interfaces and a processing circuitry communicatively coupled to the user interface and to the plurality of communication interfaces. The processing circuitry identifies a first Internet communication pathway serviced by the plurality of communication interfaces, determines a first service characteristic of the first Internet communication pathway, and further determines a second service characteristic of a second Internet communication pathway, serviced by the plurality of communication interfaces. The processing circuitry indicates graphically the service characteristics, via the user interface, of each of these communication pathways and establishes a voice call with the first Internet communication pathway. Further, the processing circuitry responds to the user interface in selecting the Internet communication pathway and transfer service of the voice call from the first Internet communication pathway to the second Internet communication pathway.

In another embodiment, the voice communication device establishes a voice call via a first Internet communication pathway serviced by the plurality of communication interfaces and determines service characteristics of the first Internet communication pathway and of a second Internet communication pathway serviced by the plurality of communication interfaces. Then the processing circuitry compares service characteristics of the first Internet communication pathway with the second Internet communication pathway and transfer service of the voice call from the first Internet communication pathway to the second Internet communication pathway.

In one more embodiment, the voice communication device consists of a user interface, a plurality of communication interfaces and a processing circuitry communicatively coupled to the user interface and to the plurality of communication interfaces. The processing circuitry determines service characteristics of a first Internet communication pathway and of a second Internet communication pathway serviced by the plurality of communication interfaces and compares the service characteristics of the first communication pathway with the service characteristics of the second Internet communication pathway. Then, based upon the comparison, the processing circuitry selects the first Internet communication pathway and establishes a voice call with a remotely located terminal via the first Internet communication pathway.

Features and advantages of the present invention will become apparent from the following detailed description of the invention made with reference to the accompanying drawings.

DETAILED DESCRIPTION OF THE INVENTION

Figure 1:
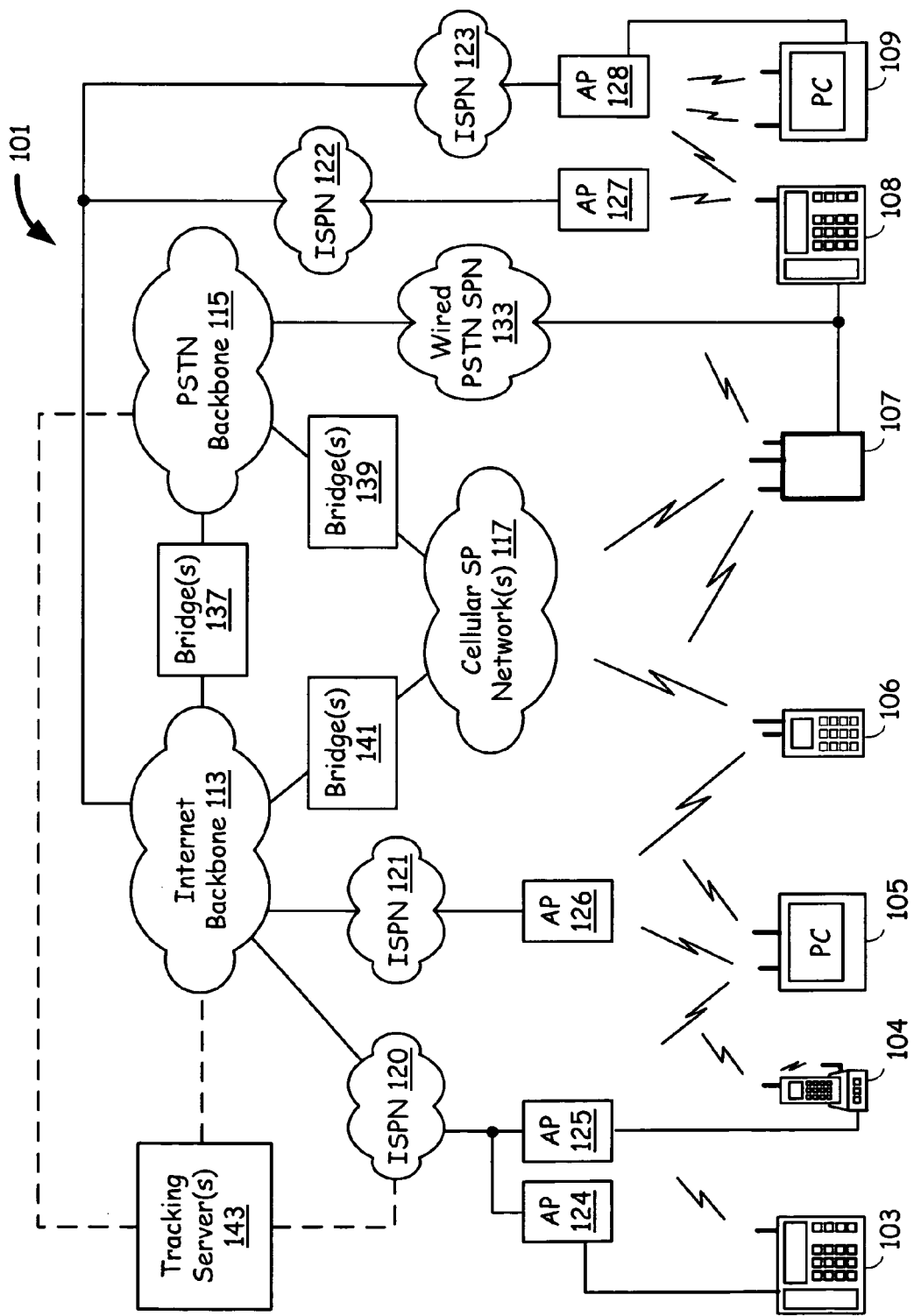
FIG. 1 is a schematic block diagram of a voice communication infrastructure, built in accordance with the present invention, illustrating a plurality of voice communication devices, that perform pathway analysis, selection and handoff to maintain at least acceptable communication quality and to manage costs.

FIG. 1 is a schematic block diagram of a voice communication infrastructure 101, built in accordance with the present invention, illustrating a plurality of voice communication devices, and that perform pathway analysis, selection and handoff to maintain at least acceptable communication quality and to manage costs. Within the voice communication infrastructure 101, a plurality of service providers support the plurality of voice communication devices by making available a plurality of packet switched network pathways and a plurality of circuit-switched telephone network pathways. Prior to attempting voice call setup, each voice communication device analyzes the available call pathways and selects, either automatically or through user interaction, one of the pathways based on several factors, such as quality of service and cost. Once a call has been established on the selected pathway, analysis of that and the other available pathways continues, and handoff may occur: a) if problems arise in the current pathway; b) if an unselected pathway becomes more desirable, e.g., begins to exhibit superior performance or acceptable performance at reduced cost; c) if a desirable pathway becomes available (e.g., comes online or is in-range); or d) per user direction.

More specifically, each voice communication device 103-109 have two or more options for establishing and maintaining call pathways between any of the other voice communication devices 103-109. Each call pathway originating from a voice communication device (hereinafter the "voice originating device") flows upstream through: a) one of access points 124-128; b) an access point (not shown) within one of cellular service provider networks 117; or c) an access point (not shown) within a wired PSTN (Public Switched Telephony Network) service provider network 133. From there, each pathway continues through a service provider network, e.g., Internet service provider networks 120-122, the wired PSTN service provider network 133, or the one of the cellular service provider networks 117 and bridges 139 or 141, to an Internet backbone 113 or PSTN backbone 115, completing the upstream portion of the pathway.

Before beginning the downstream portion of the pathway, bridging may be required to enter the network backbone that supports the destination (hereinafter the "voice destination device"). For example, the call pathway may continue via bridges 137 from the Internet backbone 113 to the PSTN backbone 115 or vice versa. Thereafter, for the downstream portion, the call pathway will flow from the Internet backbone 113 or the PSTN backbone 115: a) to the Internet service provider networks 120-122 and on to the access points 124-128; b) through the bridges 141 or 139 to one of the cellular service provider networks 117; or c) to the wired PSTN service provider network 133. From there, the call pathway passes and terminates with the voice destination device.

For every call between a first voice communication device and a second voice communication device, there are two call pathways employed. The first pathway delivers voice data, representing a speaker's voice that is captured by the first device, from the first device to the second device. Similarly, the second pathway delivers voice signals from the second device to the first device. The first and second pathways might flow at least partially through the same underlying path as will be described with reference to the FIG. 11. Call conferences among additional voice telephony devices would, of course, require additional pathways.

There are many types of voice communication devices contemplated. For example, the voice communication devices 103-108 comprise a first desktop telephone, cordless phone, first computer, VoIP cell phone, generic phone device, second desktop phone, and a second computer, respectively. The voice communication device 103 supports a wireless link to the access point 125 and a wired link to the access point 124. The voice communication device 104 supports a wired link and a wireless link to the access points 125 and 126, respectively. Three wireless links are available from the voice communication device 105 to the access points 125 and 126 via a first radio (not shown) and to one of the cellular service provider networks 117 via a second radio (not shown). The voice communication device 106 has the same potential connectivity as the voice communication device 105 yet without the wireless link to the access point 125. The voice communication devices 107 and 108 both support a wireless link to the access point 127 and a wired link to the wired PSTN service provider network 133. In addition, the voice communication device 107 supports wireless pathways to the access point 126 and to one of the cellular service provider networks 117. Likewise, the voice communication device 108 also supports wireless communication with the access point 128. Finally, the voice communication device 109 employs two radios (not shown) and a wired link that are independently capable of providing connectivity to the access point 128.

Each of the Internet service provider networks 120-123 may have one or more nodes therein through which a call pathway may flow. These nodes may also be arranged to provide several independent call paths there through. Similarly, the Internet backbone 113, PSTN backbone 115, cellular service provider networks 117, and wired PSTN service provider networks 133 may provide multiple nodes therein arranged to form one or more paths there through. For example, the Internet backbone 113 is a combination of routers and switches (equipment or "nodes") that together form the routing backbone for packets through the Internet. Thus, even following what might appear to be a single call pathway from one voice communication device to another might actually entail a path that diverges into multiple potential paths, such divergence, or a selection of one of the multiple potential paths often being beyond the control of the voice communication devices.

Thus, for example, in advance of attempting to setup a call from the voice communication device 107 to the voice communication device 103, the voice communication device 107 evaluates four upstream pathways (via the cellular service provider networks 117 and access points 126-127) and two downstream pathways (via the access points 124-125). In other words, ignoring divergence, eight (8) overall call pathways between the devices are possible. By gathering quality of service and link cost information, each of the eight pathways can be compared and contrasted to yield a pathway selection decision. The selected of the eight possible pathways might include cost-free Internet access points, such as access points 125 and 127, if the underlying quality of service seems sufficient. Depending on the configuration of the voice communication device 107, instead of automatically selecting one of the available pathways, all eight, the most desirable few, or the most desirable one, might be offered to the user for selection or confirmation. Thereafter, the voice communication device 117 establishes the call with, and the outgoing call pathway to, the voice communication device 103 via the selected pathway. The voice communication device 103 may utilize the outgoing call pathway of the voice communication device 117 for its own outgoing call pathway by reversing the node order. Alternatively, the voice communication device 103 may choose an entirely or partially different pathway to the voice communication device 117. This may be performed at substantially the same time as the voice communication device 117 is analyzing its available outgoing pathways, or only after receiving a resulting call setup request. Lastly, depending on the configuration of each of the voice communication devices 117 and 103, the selection of voice pathways could be jointly determined. For example, the voice communication devices 117 and 103 could settle on a single, bi-directional voice pathway that provides at least sufficient overall performance, even if a better pathway from one of the voice communication devices 117 and 103 to the other is available to avoid having two different voice pathways (incoming and outgoing).

Joint and independent pathway determinations effect billing. In a conventional PSTN network, the link costs of the call are charged to the calling telephone's account. This approach can be duplicated by passing charges incurred by both incoming and outgoing voice pathways to the voice communication device 117. This "total" charge, often per minute in format, is used for selection purposes. So for example, a caller that operates the voice communication device may be willing to accept lower but acceptable quality of service so long as such caller has control over both the outgoing and incoming pathways to control an assessed per minute cost. In another configuration, a calling voice communication device might be assessed charges for its outgoing pathway only, while the incoming voice pathway is assessed against the receiving voice communication device. In yet another configuration, a calling device could split the overall costs equally, or independently as is necessary by each to compensate their underlying service provider.

In addition to selecting pathways to support a call between first and second voice communication devices, the first voice communication device may, alone or with participation of and/or confirmation from the second voice communication device, choose to handoff at least a portion of the call based on ongoing pathway analysis and comparison, i.e., based on pathway availability, quality of service and cost. For example, handoff may comprise changing only a portion of the call pathway from the first to the second voice communication device. Handoff may also comprise changing the entire pathway from the first to the second voice communication device, while leaving the pathway from the second to the first intact. Other combinations are also possible, including changing the full voice pathways in both directions or changing a portion of each pathway direction.

For example, after call setup, the voice communication device 104 maintains an outgoing call pathway to deliver voice signals captured by the voice communication device 104. This pathway might flow through the access point 126, Internet service provider network 121, Internet backbone 113, bridges 141 and, finally, through the cellular service provider network 117 to the voice communication device 106. At the same time, the voice communication device 106 maintains its own outgoing call pathway merely through the access point 126 for delivery of voice signals captured at the voice communication device 106 to the voice communication device 104. As the voice communication device 104 migrates away and out of range of the access point 126, the outgoing call pathway from the voice communication device 106 is handed off such that it shares the outgoing call pathway of the voice communication device 104 but in the reverse direction. This handoff may have been performed automatically without ever having informed the voice communication device 104 although information relating to the handoff could be shared or cooperatively approved. In alternate configurations, such handoff may have required user approval or might have occurred in response to user initiation via the voice communication device 106 beforehand. Configuration might have also required such approval or initiation to come from the voice communication device 104 or user thereof, instead of or in addition to that required from the voice communication device 106. Later, as the voice communication device 106 migrates back in range of the access point 126, both call pathways may be handed off to merely flow through the access point 126. This bidirectional call pathway handoff might be performed in concert or independently and with or without user involvement. Such configuration may be established as factory default settings that can be changed by: a) the users of the voice communication devices through optional setup settings; and b) any authorized network device, such as service provider equipment, via one of the illustrated call pathways or, for example, through stored settings within an operator's SIM (Subscriber Identity Module) card.

One or more tracking servers 143 assist each of the voice communication devices 103-109 in identifying network identifiers (e.g., telephone numbers, handles, network address) of other of the voice communication devices 103-109 so that the plurality of call pathways can be found and analyzed. The tracking servers 143 may also perform at least part of the analysis for the voice communication devices. Such analysis can be performed on a periodic basis, or upon receiving a specific request from a voice communication device. The tracking servers 143 connect to the Internet backbone 113 through the Internet service provider network or independent thereof as indicated by the two dashed lines. Whether or not such analysis support is provided by the tracking servers 143, the underlying voice communication devices may independently perform their own analysis in supplement, for verification, or in replacement.

Along with voice signaling, a call may be supplemented with text, image, live video, predefined video, and background music exchanges. Pathways for delivery of such supplemental media may follow the same pathway as the voice signals, but need not. A voice communication device may use an available and possibly better (e.g., specifically tailored) pathway for such media. Analysis of quality of service and cost for automatic and user integrated pathway selection and handoff described above applies equally to supplemental media pathways. In other words, based on an analysis of a plurality of pathways, a call is setup along an outgoing voice pathway and incoming voice pathway, while images and text are exchanged: a) via up to four additional pathways; or b) along the two established for the voice signals.

The voice communication devices 105-108 support both packet switched network telephony via intranet and Internet networks, and circuit switched network telephony via wireless (cellular) and wired public switched telephony networks. These voice communication devices are herein referred to as dual voice communication devices. The voice communication devices 103-109 incorporate at least one of the processing circuitry described with reference to the FIGS. 5 and 10.

In one embodiment, a voice communication device is configured to perform one of four basic handoff operations, prior to or during a call. These operations include immediate public switched telephone network to Internet handoff, mid-call public switched telephone network to Internet handoff, immediate Internet to public switched telephone network handoff, and mid-call Internet to public switched telephone network communication full, bi-directional pathway handoff. The processing circuitry performs these four operations in conjunction with the public switched telephone network interfaces and packet switched network interfaces (described with reference to the FIGS. 5 and 10), which are also incorporated into the voice communication devices 105-108. These four basic operations are end-to-end transfer operations and use either an end-to-end Internet communication pathway or end-to-end public switched telephone network communication pathway. In addition to these four basic operations, the processing circuitry also performs mixed path handoff operations and provides supplemental pathway support, and, may provide either different call pathways for each phone's generated call data, splitting the call data by type (e.g., audio versus video) across multiple pathways, or combinations thereof, as mentioned above. Each unbroken segment of a voice communication/video/data exchange via a single communication pathway is herein described as a calling session.

In these call operations, the processor and interfaces determine one of plurality of pathways available through the channels of the voice communication device 105-108 interfaces, service providers and Internet/public switched telephone network backbone based upon user or manufacturer preset service characteristic configurations. In general, the service characteristic configurations include quality of service of a call session and cost of usage via the Internet communication pathway per a unit of time. Based upon the service characteristic configurations and real time user input, the voice communication device 105-108 transfers to one of many available communication pathways mentioned above, to service a call session. The transfer may occur either before serving a call or during the call.

In Internet voice communication, the COder-DECoders (CODECS, described with reference to the FIGS. 5 and 10) produce voice data packets that represent voice signals at the voice communication device 105-108. These voice data packets may be transmitted along packet switched portions of the call pathway, i.e., between the Internet backbone 113 and the access points 124-128.

The access points 124-128, as illustrated, support wired Local Area Networks (LAN), wireless Local Area Networks (WLAN) and wired or wireless point-to-point links. Wireless transmission signal strength, error rates, noise, WLAN/LAN loading, WLAN/LAN bandwidth, forwarding delays, service guarantees, and link costs are exemplary concerns associated with these pathway nodes. Similar concerns are associated with the wired and wireless (cellular) circuitry switched access points, i.e., the cellular service provider networks 117 and the wired PSTN service provider network 133. The Internet service provider networks 120-123 inject further of the same concerns. Absent link costs, all of the aforementioned concerns are herein referred to as "quality of service concerns."

The pathway through the Internet backbone 113 consists of a plurality of nodes (e.g., switches and routers) arranged to provide an internal pathway through the Internet backbone 113 such that the voice data packets reach either the destination voice communication device (via the Internet service provider networks 120-122 and the access points 124-128) or the bridges 141 or 137. As with other portions of the call pathway, the Internet backbone 113 introduces further quality of service concerns. For example, in this segment of call pathway, voice data packets may be lost, delayed, or reproduced incorrectly during retransmission. The bridges 137 and 141 introduce yet other quality of service concerns as also do the cellular service provider networks 117 and the wired PSTN service provider networks 133. A series of overall quality of service characteristics are constructed for each direction of the call pathway, even though one direction might suffice. Overall pathway costs are also summed. Together, the series of characteristics and cost may yield an automatic handoff or selection, or require user confirmation. In addition, the series of quality of service characteristics are combined to produce one or a few easily understood quality of service indications for presentation to the user. Along therewith, costing information is also displayed. From the quality of service indications and costing information, a user of the underlying voice communication device may initiate handoff, abandon a call setup attempt, or confirm or reject a handoff request from the underlying voice communication device or the remote voice communication device that will participate, or is participating, in the call. Such indications and costing information may be displayed on a screen of the voice communication device.

Each of the voice communication devices 103-109 and the tracking servers 143 analyze call pathways to identify quality of service characteristics (hereinafter the "service characteristics") in one of many possible ways. Some service characteristics can be identified by evaluating characteristics of setup and voice/supplemental media data signaling exchanged through a pathway. Supplemental test information can be added to such setup and data signaling and/or independent test signaling can be employed in addition or instead to support the analysis. For example, test packets, such as Echo Request Packets, can be sent along the communication pathway long before a call setup request is received (historical), as part of call setup, and mid-call. Setup and data signaling either tailored with to support testing or as is can be used. Other service characteristics may be predefined for an entire pathway or any portion thereof.

More specifically, for example, to gather service characteristics such as a pathway's propagation delay, echo request packets may be sent as part of call setup and periodically during a call session, e.g., once every few minutes, through the current pathway and through other available but currently unused pathways. Instead of merely time based periodicity, the echo request packets, or other test packets may be sent only when a dead voice data packet is detected by a CODEC or might be exchanged immediately after each two hundred voice packets are transmitted. Further, the call and supplemental media pathways may be analyzed based upon or in response to user input via user interface (described with reference to the FIG. 6).

The voice communication devices 103-109 and the tracking server(s) 143 select or aid in the selection of call and supplemental media pathways based upon an evaluation and comparison of service characteristics and cumulated pathway costs. The analysis of Internet communication pathway may be performed using one of following ways: (a) by sending a special Internet protocol control message packets to the recipient voice communication device 113, 117, 119 or 121 (CODEC to CODEC), receiving and analyzing response; (b) by utilizing echo request packets and corresponding network testing functionality to analyze an Internet communication pathway; (c) by utilizing other available and/or prospective network testing functionality; and (d) by requesting service characteristics from others. Examples of requesting service characteristics from others include: 1) the tracking servers 143 receiving service characteristics, from underlying voice communication devices that performed at least a portion of the pathway analysis, to service other inquiring voice communication devices; 2) a first voice communication device may receive service characteristics from a second communication device that performed at least a portion of the pathway analysis; 3) delivery of characteristics from any node within the pathway to any other node within the pathway of characteristics of that node or any portion of the underlying pathway that such reporting node either analyzed itself, was preset to deliver, or had been received by another that performed the analysis. All of the debug tools used today function by sending a special echo request packet through the network, such underlying functionality utilized in voice communication devices for service characteristics analysis.

In other words, in addition to test signals originating from a source to a destination, a service information request can be communicated through the pathway to all nodes or a select node therein. In response to the service information request, a node reports back with pre-stored service information or provide an indication that none exists. Similarly, if a service analysis request is delivered to all nodes or a select node in a pathway, capable nodes will analyze and report results to the requesting node, e.g., the voice communication device managing the overall analysis. Service analysis requests may also comprise a request for periodic testing for the duration of a calling session or longer. Both service analysis requests and service information requests may identify that all or any portion of the various types of service characteristics are desired in response.

In some embodiments, the analysis of service characteristics may also involve underlying CODECs. For example, the sending from one CODEC of a special Internet protocol control message packets to the recipient CODEC of one of the voice communication devices 103-109 allows the processing circuitry of the CODECs (FIG. 5) to determine a variety of service characteristics. For example, the processing circuitry can measure the delay and arrival of dead packets (incorrect reproduction of the message packets) along an Internet communication pathway. In a half duplex system, the delay and dead packets may be analyzed by tracing the forward pathway (from the calling voice communication device to the receiving voice communication device) and return pathway (from the receiving voice communication device to the calling voice communication device). Specifically, at least supporting portions of network analysis functionality such as sending echo request packets and analyzing the response can be incorporated into each CODEC to assist in determining the communication delay along the Internet communication pathway mentioned above. It further allows the processing circuitry to determine the nodes in the Internet backbone 113 that cause delay or dead packets. Some of the nodes in the Internet backbone 113 may specifically support prioritized treatment of voice packets.

Figure 3:
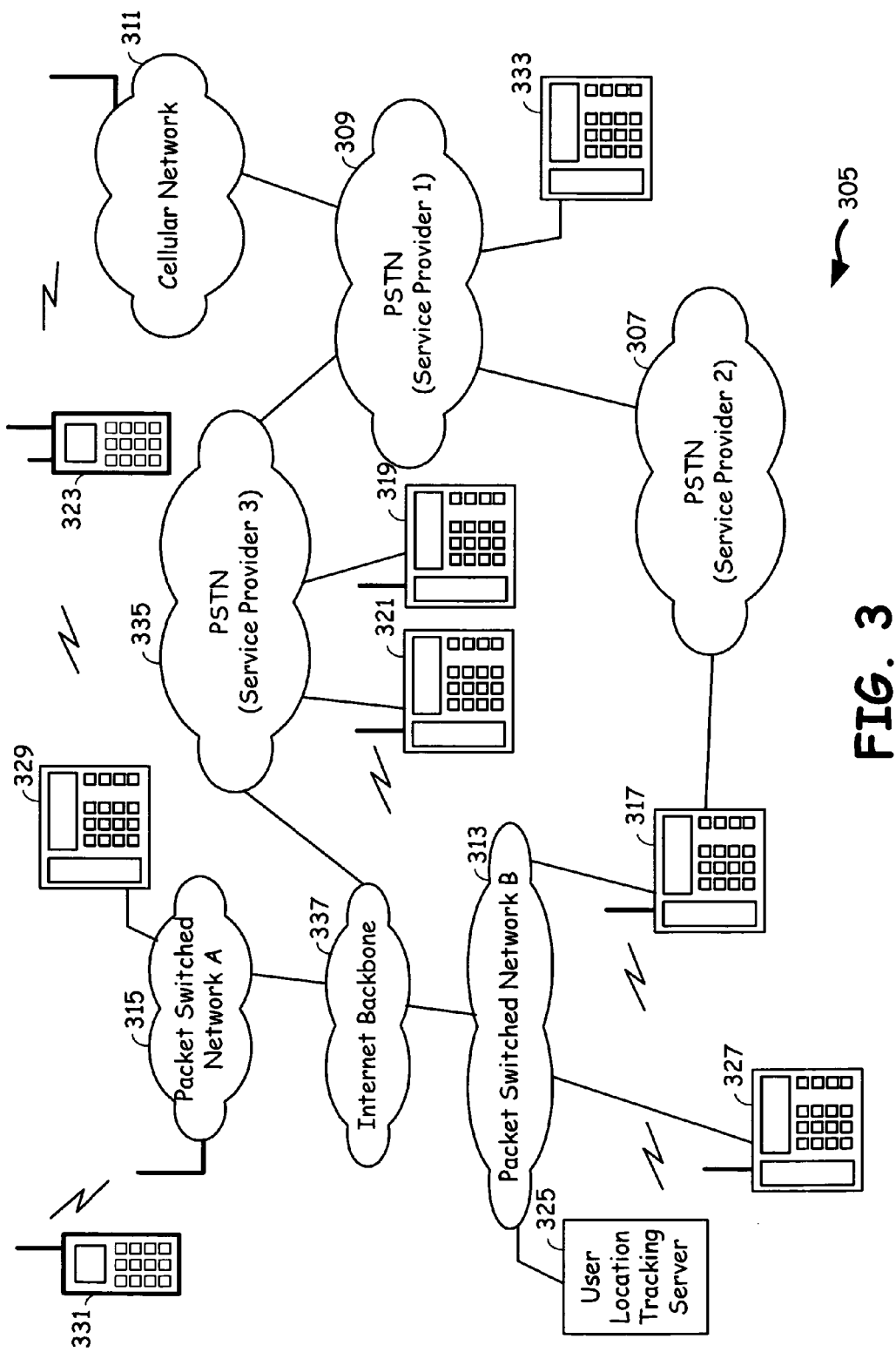
FIG. 3 is a block diagram illustrating an embodiment of voice communication devices that maintain communication quality, in which a public switched telephone network service provider performs the evaluation of communication pathways and transfer between communication pathways.
Figure 4:
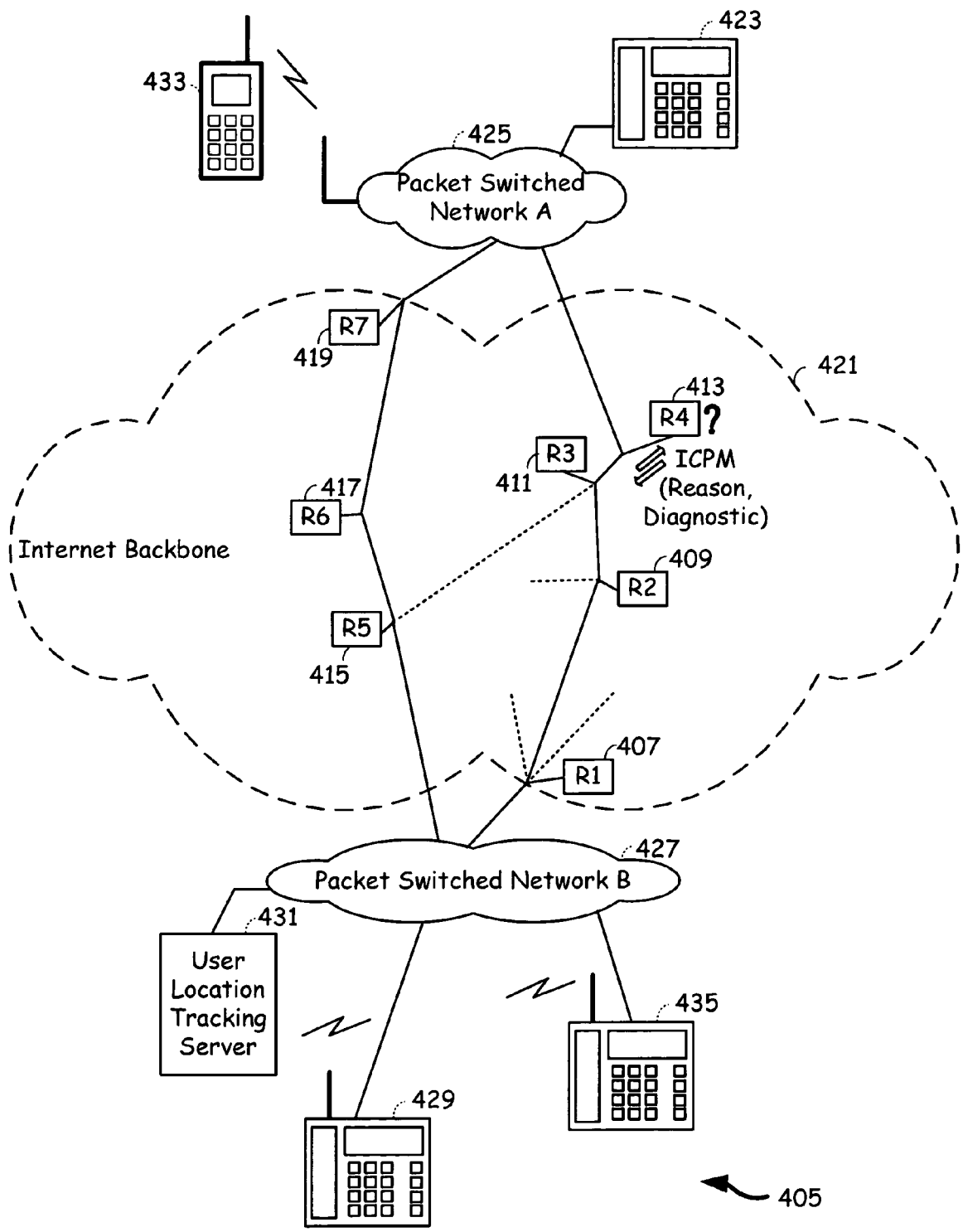
FIG. 4 is a block diagram illustrating an embodiment of voice communication devices that maintain communication quality, with detailed structure of a typical Internet backbone.
Figure 11:
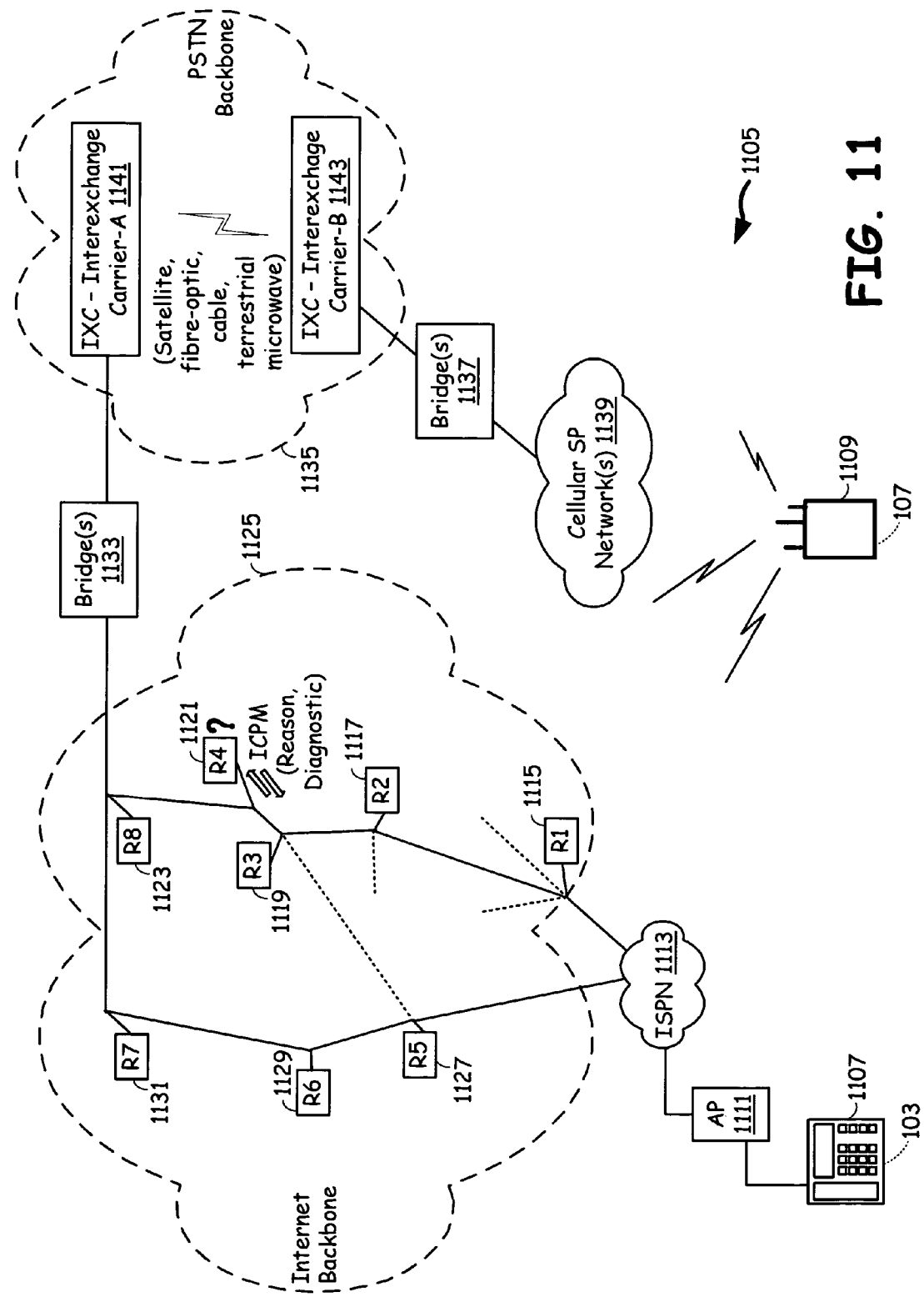
FIG. 11 is a block diagram illustrating typical communication pathways through which the voice packets that emanate from voice communication devices that maintain communication quality traverse, while communicating via mixed communication pathways of Internet and PSTN backbones.

Detailed discussion of functioning of network analysis functionality can be found with reference to the FIG. 4 and 11. Further, discussion on servers analyzing the Internet communication pathways may be found in description with reference to the FIGS. 2 and 3. In addition, the processing circuitry also performs cost analysis of each communication pathway, as mentioned above, by sending a link cost request to one or all of the nodes in a pathway. The processing circuitry sums all of such link costs to produce a total for comparison with that of other pathways.

In addition to the analysis of a plurality of communication pathway before the call and during the call, the processing circuitry also takes its own measures to provide Quality Of Service (QOS) guarantee to the user. These include decreasing the voice data packet size, decreasing image resolution if periodically sending images, sending voice data packets using multiple Internet Protocol (IP) addresses, utilizing multiple pathways, switching pathway from backbone to access point, making choices about Internet backbone and thus provides QOS guarantee.

The voice communication devices 103-109 typically offer a large graphical display that presents detailed graphical display of service characteristics and costing of current and potential call and supplemental media pathways. In many of the voice communication devices 103-109, the graphical display in one detailed view includes statistical delay information (e.g., 120 ms, +/−120%, etc.) and link cost information ($0.025 per minute) for each node in a call pathway along with a grand total for the entire pathway. In a less detailed view, each of a plurality of available pathway "grand totals" are displayed for comparison and selection, and can be sorted by cost or delay. Many types of service characteristics can be included. An overall QOS rating of the communication pathway may also or alternatively be presented along with costing. Instead of making an unskilled user sift through more technical service characteristics, the processing circuitry can compute the overall QOS rating, which may be for example a number from 1 to 100, that coupled with costing will allow a user to quickly decide to select a pathway or accept a handoff. In addition, a first QOS rating for the outgoing voice pathway and a second QOS rating for the incoming voice pathway are displayed to the user during the entire call session. Thus, both users engaged in the call will be able to monitor current pathway conditions. Switching to a detailed view will even allow a user to identify one or more nodes in the overall pathway that are causing the problem. Instead, the user may merely switch to a screen showing other pathway options for handoff. Such overall QOS ratings may also be used by the underlying voice communication device for either automatically choosing an alternate pathway or pathway portion and performing the handoff. Also, QOS ratings may be constructed independently for supplemental media and: a) displayed as needed for the user; and b) used by the underlying voice communication device in selecting to handoff a pathway. Herein, the phrase "handing off" or "handoff" is meant to include both entire pathway substitution and merely substitution of a portion of a pathway thereof.

When a user is communicating using a particular communication pathway, service characteristics regarding that communication pathway are presented. When the user requests for details regarding an alternative communication pathway by pressing EVALUATE key (described with reference to the FIG. 6), the graphical display presents service characteristics of an alternative communication pathway. In a half duplex communication, the graphical display provides service characteristics of both forward and return communication pathways. In one embodiment, the graphical display may present a detailed map with nodes shown at different geographical areas with details about delay, lost packets, QOS rating, node address, and locations. The cost of the communication path (or link) usage is also presented. In another embodiment, the graphical display may present these details in a table format and allow comparison between different communication pathways. QOS ratings and costs may also be managed by the tracking servers 143 or by any other node in a pathway.

Some of the voice communication devices 103-109 offer a user three or more options in evaluating the communication pathways and handling transfer from one communication pathway to another. These are manual, semi-automatic and automatic evaluate and transfer options. In the manual evaluate and transfer option, a user interacts with a user input interface and a display of the voice communication device to select from a plurality a first communication pathway to evaluate. In response, the voice communication device analyzes the pathway in at least one of the variety of approaches mentioned above and displays the results (of both service characteristics and costs) in more and less detailed modes. If satisfied with the displayed results, the user may initiate a call session through the analyzed pathway. Similarly, the user could select to evaluate two to all available pathways at the same time and deliver the results from such pathways for comparison and selection. In semi-automatic evaluate and transfer option, the user may initiate an evaluation of two or more of the available pathways, but the voice communication device displays service characteristics and costs of only those pathways that meet preset service characteristic and cost requirements. In an automatic evaluate and transfer option, the user may merely select the destination voice communication device and press a call button. In response, the user's voice communication device evaluates available pathways and initiates the call session via outgoing and incoming pathways that best meets preset service characteristics requirements.

The service characteristic configurations itself (mentioned above) may include: (a) an "evaluate and transfer" option, which allows a voice communication device or the user to take transfer decisions based upon user set criteria; (b) "default mode—Internet or public switched telephone network" option, that allows the user to prefer a default communication pathway between Internet and public switched telephone network; (c) "quality threshold" setting, that allows the user to set a number between 0 to 9, 0 being the lowest quality threshold and 9 being the highest quality threshold; (d) "link cost considerations", that allows the user to set a cost preference by entering a number between 0 to 9, 0 being the lowest cost consideration and 9 being the highest cost consideration; and (e) "prompt before automatic transfer" option.

The process of determining an Internet communication pathway may be manual, semi-automatic or completely automatic based upon evaluate and transfer option setting. The processing circuitry evaluates the service characteristics of an Internet communication channel based upon a wireless interface signal strength and/or voice quality provided by the Internet communication pathway. If a default mode—Internet is enabled, the processing circuitry utilizes one of the available Internet communication pathways via Internet interfaces, service providers and the Internet backbone 135 to initiate a call session. Further, the processing circuitry also considers cost of usage of link.

Figure 2:
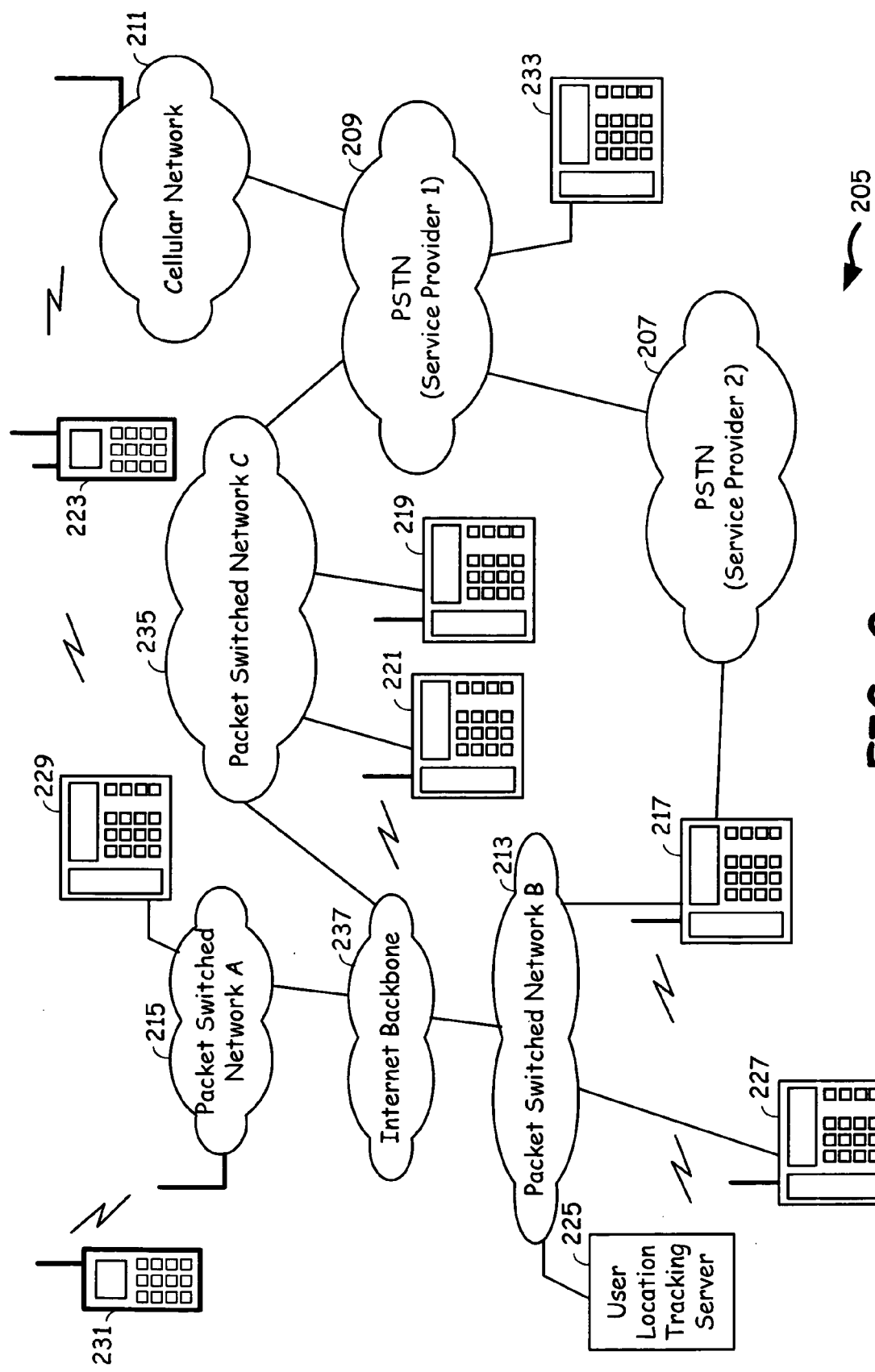
FIG. 2 is a block diagram illustrating an embodiment of voice communication devices that maintain communication quality, in which a packet switched network service provider performs the evaluation of communication pathways and transfer between communication pathways.

FIG. 2 is a block diagram 205 illustrating an embodiment of voice communication devices that maintain communication quality, in which a packet switched network service provider performs the evaluation of communication pathways and transfer between communication pathways. The illustrated infrastructure comprises another embodiment in which a packet switched network C 235 provides pathway analysis, selection, and handoff support to voice communication devices 221 and 219. The packet switched and public switched telephone network service provider's networks shown also illustrate packet switched networks A, B 213 and 215, public switched telephone network service provider's networks 1, 2 209 and 207 and a cellular network 211. Internet voice communication devices 227 and 229, 231 are communicatively coupled to the packet switched networks B 213 and A 215 respectively. Similarly, a public switched telephone network voice communication device 233 is communicatively coupled to the public switched telephone network service provider's network 209. The packet switched network B 213 and the public switched telephone network service provider's network 2 207 provide service to a voice communication device 217. The packet switched network A 215 and the cellular network 211 provide service to a cell phone 223 that supports both Internet and public switched telephone network telephony. An Internet backbone 237, comprising many Internet nodes or routers (described with reference to the FIGS. 4 and 11), allow Internet voice communication to take place between the voice communication devices 217, 219, 221 and 223 and Internet phones 227, 229 and 231. The tracking server 225 allows location tracking of the Internet communication devices.

The voice communication device 217 or 223 is communicatively coupled to the packet switched networks A or B 215 or 213 via a wired Local Area Network (LAN) or Wireless Local Area Network (WLAN). The voice communication device 217 is also simultaneously communicatively coupled to the public switched telephone network service provider's network 2 207 via a line cord or wirelessly. The cellular phone 223 is also communicatively coupled to the cellular network 211 wirelessly.

Dual voice communication devices 221 and 219 are communicatively coupled to the packet switched network C 235 alone. The dual voice communication device 221 or 219 allow user to evaluate the communication pathways and switch from public switched telephone network to Internet communication pathway or vice versa. Here, the packet switched network C 235 provides evaluate and transfer support to the dual voice communication device 221 or 219. The processing circuitry incorporated into the dual voice communication devices 221 and 219 transmit appropriate control signals to the packet switched network C 235, based upon the user input, for the evaluation of communication pathways and transfer/handoff to take place. The dual voice communication devices 221 and 219, for example, may transmit service characteristic configurations to the packet switched network C 235 before initiating a call. This enables the service provider to evaluate communication pathways and transfer according to the configuration settings.

FIG. 3 is a block diagram 305 illustrating an embodiment of voice communication devices that maintain communication quality, in which a public switched telephone network service provider performs the evaluation of communication pathways and transfer between communication pathways, in accordance with the present invention. The infrastructure shown is one more embodiment in which a public switched telephone network service provider 3 335 provides pathway analysis, selection and handoff support to dual voice communication devices 321 and 319. The packet switched and public switched telephone network service provider's networks shown also illustrate packet switched networks A and B 315 and 313, public switched telephone network service provider's networks 1, 2 309 and 307 and a cellular network 311. Internet Phones 329, 331 and 327 are communicatively coupled to the packet switched networks A 315 and B 313 respectively. Similarly, a phone 333 is communicatively coupled to the public switched telephone network service provider's network 1 309. The packet switched network B 313 and the public switched telephone network service provider's network 2 307 provide service to a dual voice communication device 317. The packet switched network A 315 and the cellular network 311 provide service to a cell phone 323 that supports both Internet and public switched telephone network telephony. An Internet backbone 337, comprising many Internet nodes or routers (described with reference to the FIGS. 4 and 11), allow Internet voice communication to take place between the dual voice communication devices 317, 319, 321 and 323 and Internet phones 327, 329 and 331. The tracking server 325 allows location tracking of the Internet communication devices.

The dual voice communication device 317 or 323 is communicatively coupled to the packet switched networks A 315 or B 313 via a wired Local Area Network (LAN) or Wireless Local Area Network (WLAN). The dual voice communication device 317 is also simultaneously communicatively coupled to the public switched telephone network service provider's network 2 307 via a line cord or wirelessly. The cellular phone 323 is also communicatively coupled to the cellular network 311 wirelessly.

Dual voice communication devices 321 and 319, in this embodiment, are communicatively coupled to the public switched telephone network service provider's network 3 335 alone. The dual voice communication device 321 or 319 allow user to evaluate the communication pathways and switch from public switched telephone network to Internet communication pathway or vice versa. Here, the public switched telephone network service provider's network 3 335 provides evaluate and transfer support to the dual voice communication device 321 or 319. The processing circuitry incorporated into the dual voice communication devices 321 and 319 transmit appropriate control signals to the public switched telephone network service provider's network 3 335, based upon the user input, for the evaluation and transfer to take place. The dual voice communication devices 321 and 319, for example, may transmit service characteristic configurations (described with reference to the FIG. 1) to the public switched telephone network service provider's network 3 335 before initiating a call. This enables the service provider to evaluate communication pathways and transfer according to the configuration settings.

FIG. 4 is a block diagram 405 illustrating an embodiment of voice communication devices that maintain communication quality, with detailed structure of a typical Internet backbone 421, in accordance with the present invention. The detailed Internet backbone shown illustrates a plurality of communication pathways via routers. Two of these Internet communication pathways flow via nodes (routers or switches) 407, 409, 411 and 413, and nodes 415, 417 and 419. A voice communication device 433, Internet phones 429, 435 and 423, packet switched networks A & B 425 & 427 and a tracking server 431 are also shown.

In addition to other analysis techniques for identifying service characteristics, the network analysis functionality used by the voice communication devices, and other network nodes described herein include analysis functionality of echo request packets. For example, the voice communication device 433 may determine the service characteristics of the Internet communication pathway made up of nodes 407, 409, 411 and 413 by utilizing the echo request packets. In particular, for example, the voice communication device 433 sends a special packet called Internet Control Message Protocol (ICMP) Echo Request (either independently or together with voice data packets) and receives an echo reply in return from each of the nodes 407, 409, 411 and 413 along the Internet communication pathway to the voice communication device 433. The ICMP Echo Request Packet consists of a packet header (i.e., an Ethernet header, IP header and ICMP header) and a packet payload consisting user data. The nodes 407, 409, 411 and 413 place original ICMP Echo Request Packet into the data field of the echo reply.

The echo reply may consist information regarding the IP address of the nodes 407, 409, 411 and 413, a sequence number (indicating the number of the node in order, starting from 0), a Time To Live (TTL) field and the delay information. A skipped sequence number may indicate a lost or dropped packet. The delay information consist the time taken for the packet to return in milliseconds. The illustration of the Internet backbone also shows a node 413, which may be the cause of a dropped packet or an unreasonable time delay, for example.

Using echo request packets and the corresponding network testing functionality, the voice communication device 433 may receive further information, other than time delay, regarding the Internet communication pathway such as information about network packets being dropped because of network congestion, information regarding asymmetric path (half-duplex), potential trouble spots in the path, available bandwidth and size of the pipe per hop. When programmed to analyze an Internet communication pathway over time, the voice communication device 433 utilizes such and other types of service analysis operations repeatedly, and performs statistical analysis of collected results. The cost of using a particular communication pathway may be determined by the service provider, and, if so, is collected by the voice communication device when needed.

Figure 5:
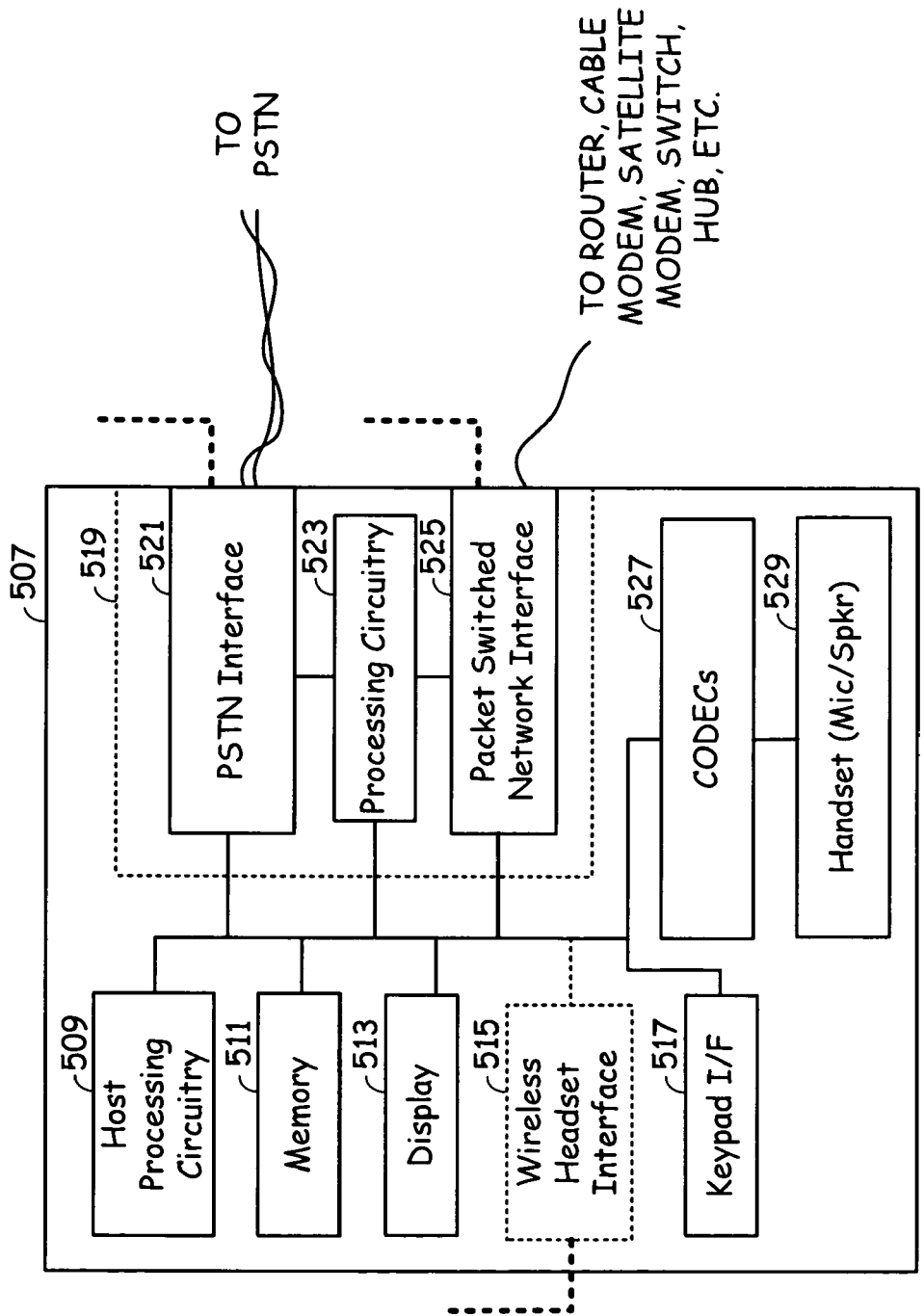
FIG. 5 is a block diagram illustrating a voice communication device constructed in accordance with the embodiments of FIGS. 1, 2 and/or 3 of the present invention.

FIG. 5 is a block diagram illustrating a voice communication device constructed in accordance with the embodiments of FIGS. 1, 2 and/or 3 of the present invention. The voice communication device 507 illustrated supports both Internet and public switched telephone network telephony, and may correspond at least in part to any of the voice communication devices herein. In other embodiments, the voice communication device of the present invention may include fewer or more components than are illustrated as well as lesser or further functionality. In other words, the illustrated voice communication device is meant to merely offer one example of possible functionality and construction in accordance with the present invention.

The voice communication device 507 generally includes host processing circuitry 509, memory 511, display 513, optional wireless headset interface 515, keypad interface 517, CODECs 527, handset 529, and communication interface 519. These components communicatively coupled to one another via one or more of a system bus, dedicated communication pathways, or other direct or indirect communication pathways. Host processing circuitry 509 may be, in various embodiments, a microprocessor, a digital signal processor, a state machine, an application specific integrated circuit, a field programming gate array, or other processing circuitry. Memory 511 may be random access memory, read-only memory, flash memory, a disk drive, an optical drive, or another type of memory that is operable to store computer instructions and data. Display 513 may be a conventional LCD display, an LED display, a touch based display, or another display. Wireless headset interface 515 may be a WPAN interface such as a Bluetooth interface, a proprietary wireless headset interface, or another wireless interface. Handset 529 enables a user to interact with the components of the bridging telephone and includes a speaker and a microphone. Keypad interface 517 enables the user to communicate with the bridging telephone via keystroke inputs. The handset 529 may be movable with respect to the rest of the components of the voice communication device. In other embodiments, the handset may be replaced by a microphone and a speaker. Such is the case when the voice communication device comprises a wireless telephone. CODECs 527 are coder-decoder pairs used to convert digital signals to analog signals and vice versa.

Communication interface 519 includes a public (circuit) switched telephone network interface 521, processing circuitry 523 and packet switched network interface 525. The public switched telephone network interface 521 supports both a wired and wireless link to public switched telephone networks, i.e., supports links to cellular and wired PSTN networks. The packet switched network interface 525 wired or wirelessly couples to the packet switched network such as intranet and Internet networks as previously described with reference to FIGS. 1, 2 and 3. Generally, the components of the voice communication device 507 work to determine service characteristics of the various communication pathways for selection and handoff. Multiple pathways may originate from a single communication interface due to pathway divergence immediately outside of the voice communication device or at any other point along the pathway. For example, the communication interface 525 might provide wireless communication to two or more access points using communication paths that at some point converge either at a common portion of a node in the pathway or at the destination voice communication device itself. The communication interface 525 might also have wired access to yet another access point that similarly converges. Other pathways that may be independent or share common portions or nodes are provided by the PSTN interface 521 and other additional network interfaces (not shown). By analyzing all of these pathways to gather or generate service characteristics and sum up overall link costs, the processing circuitry 523 can select a pathway for call setup. Thereafter, during the call session, the processing circuitry 523 may monitor service characteristics of the present and potential pathways to service automatic, automated (with user prompting/authorization), or manually initiated handoff. Such handing off may entail continuing the call session on, for example: a) an entirely different end-to-end, bidirectional pathway; or b) a modified, half-duplex portion of the pathway wherein one or more nodes are substituted for another or others. The processing circuitry 523 may coordinate the analysis and cost gathering with a tracking server, the destination voice communication device, or any node in the pathway. Likewise, handoff may be performed independently or coordinated with the: a) destination voice communication device; b) destination user; and/or c) user of the voice communication device 507. Such functionality provided by the processing circuitry 525 may be off loaded in whole or in part to the host processing circuitry 509.

The processing circuitry, one or both of the host processing circuitry 509 and the processing circuitry 523, controls the operation of the service characteristics analysis, transfer and handoff to perform these bridging operations. In performing operations, the processing circuitry 509 and/or 523 of the voice communication device 507 determines whether a call should be established or handed off to a public switched telephone network-public switched telephone network, Internet-Internet or mixed communication pathway. The processing circuitry 509 and/or 523 then obtains telephony handoff control signals for the call through the user interaction with the keypad interface or automatically based upon considerations of the quality of communication pathway and/or cost. Based upon these telephony handoff control signals or pre-programmed automatic handoff instructions, the processing circuitry 509 and/or 523 enables the public switched telephone network interface 521 and the packet switched network interface 525 to handoff the call between the public switched telephone network interface 521 and the packet switched network interface 525.

The processing circuitry 523 and/or 509 determines service characteristics of an Internet communication pathway by performing analysis of the Internet communication pathway and obtaining usage cost/second from the service provider. The analysis of Internet communication pathway may be performed by sending an Internet Control Message Protocol Echo Request Packets to analyze the Internet communication pathway to the recipient voice communication device, receiving echo reply, and analyzing the echo reply. Alternatively, the Internet communication pathway may be analyzed by utilizing traceroute/tracert type functionality. The processing circuitry 523 and/or 509 may also request the servers of the service providers to analyze the Internet communication pathway, if programmed to do so. Service characteristics of PSTN pathways may be generated by the processing circuitry 523 and/or 509 or retrieved from local memory or from any network node. Such service characteristics are scaled for comparison with Internet service characteristics, for example, by generating a QOS factor for such PSTN pathways or pathway portions for comparison to QOS factors for Internet pathways or pathway portions. Along with such QOS factors, costing information for each pathway, whether PSTN or Internet in whole or in part, can be calculated.

Test packets such as the ICMP echo request packets, may be sent by the processing circuitry 523 before call setup, separate of voice data packets during mid-call, with voice data packets during mid-call, separate of voice data packets during mid-call and/or with voice data packets during mid-call, for example. Further, after initial transmission and determination of a communication pathway the echo request packets may also be sent periodically, for example, once for every hundred voice data packets. Alternatively, the echo request packets may be sent only when a dead voice data packet is detected by the CODECs 527. Further, the Internet communication pathways may be analyzed based upon user input via user interface. The CODECs 527 may comprise independent circuitry, as illustrated, or be incorporated at least functionally in whole or in part within the processing circuitry 509 and/or 523 (described with reference to the FIG. 10).

Figure 6:
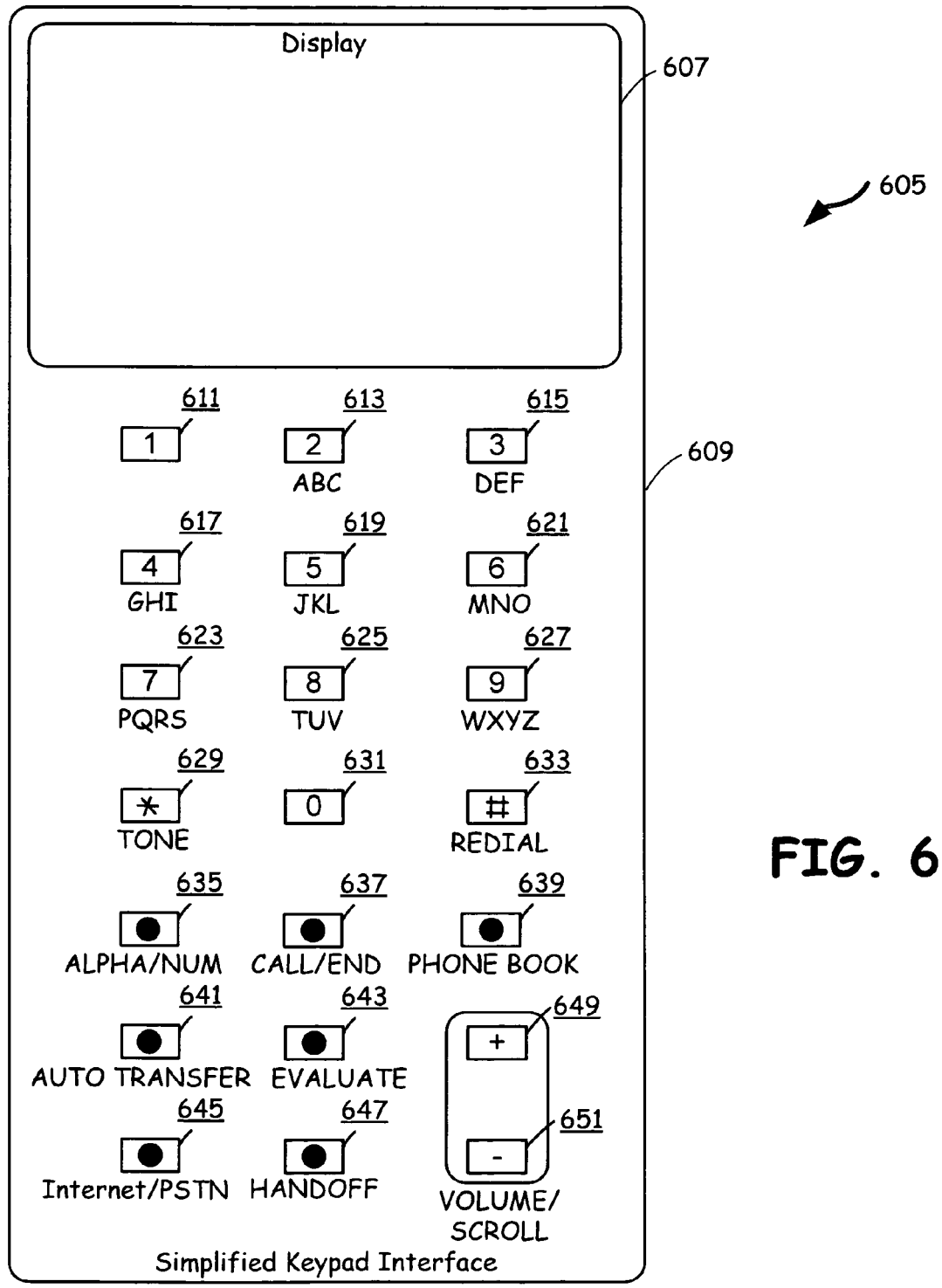
FIG. 6 is a perspective diagram illustrating a simplified keypad interface and a display in a voice communication device that supports both Internet and public switched telephone network telephony and maintain communication quality, in accordance with the present invention.

FIG. 6 is a perspective diagram 605 illustrating a simplified keypad interface and a display in a voice communication device that supports both Internet and public switched telephone network telephony and maintain communication quality, in accordance with the present invention. Keys 611, 613, 615, 617, 619, 621, 623, 625, 627, and 631 provide numerals as well as alphabets to enter telephone numbers or IP addresses, in conjunction with an ALPHA/NUM key 635. Once the key 635 is pressed, alpha or num appears on the display, and when in alpha mode, the repeated pressing of the key 613, 615, 617, 619, 621, 623, 625 or 627 makes corresponding alphabet to be displayed.

A TONE key 629 provides toggling between pulse mode and tone mode when working with the public switched telephone network calls. A REDIAL key 633 provides redial function when working with the public switched telephone network or Internet calls. A PHONE BOOK key 639, when pressed, displays the contents of the memory, that is, the names, IP addresses and the telephone numbers of the individuals as programmed by the user. To program a user name with corresponding IP address and telephone number, the user may press PHONE BOOK key 639 for more than 5 seconds and then enter corresponding information. VOLUME/SCROLL keys 649 and 651 allow user to change the volume of the speaker of the handset. In addition, when VOLUME/SCROLL keys 649 and 651 used after pressing the PHONE BOOK key 639, allows user to scroll through the contents of the memory. A CALL/END key 637 allows the user to initiate a call with a remote terminal (the telephone number or IP address of which is displayed on the display 607) when pressed via a chosen communication pathway. Similarly, during the call if key 637 is pressed, the call is terminated. Further, the CALL/END key 637 when pressed after the key press of an EVALUATE 643, allows the voice communication device to transfer to a communication pathway that is displayed on the display 607 (as described with reference to FIGS. 7, 8 and 9).

Internet/PSTN key 645 sets a default phone mode (either Internet voice call mode or PSTN voice call mode) and allows the user to make Internet to Internet calls, public switched telephone network to public switched telephone network calls, and mixed pathway calls. The function of Internet/PSTN key 645 in conjunction with the phonebook is that it allows user to select between an IP address and a telephone number when the user scrolls through the phonebook. Once the user selects a name in the phonebook, by pressing the Internet/PSTN key 645, user is able to select either an IP address or a telephone number. The processing circuitry then uses the selected IP address or telephone number to connect to a remote terminal via either Internet or public switched telephone network communication pathway, when the handset is lifted and CALL/END key 637 is pressed.

A display 607 facilitates user in the process of making the phone call and displays following information among others, when a public switched telephone network to Internet handoff takes place: (a) display a destination telephone number and retrieved IP address; (b) display a communication pathway of either Internet or public switched telephone network being used; (c) indicate graphically and quantitatively the service characteristics of the communication pathway being used; and (d) indicate when service characteristics of the communication pathway being used is below a quality threshold. Similarly, when an Internet to public switched telephone network handoff takes place, the following information are displayed: (a) a destination IP address and retrieved telephone number; (b) a communication pathway of either Internet or public switched telephone network being used; (c) indicate graphically and quantitatively the service characteristics of the communication pathway being used; and (d) indicate when service characteristics of the communication pathway being used is below quality threshold. Further, during the evaluation of service characteristics of a communication pathway, either during the call or prior to call, displays graphical analysis of the service characteristics of a communication pathway node by node.

An EVALUATE key 643 when pressed displays the service characteristics of a communication pathway graphically on the display 607. When the key 643 is pressed repeatedly, the display 607 graphically shows the analysis of other communication pathways, until all identified communication pathways are explored. Then, analysis of the first communication pathway is displayed again. Pressing the EVALUATE key 643 for more than 5 seconds allows the user to program the voice communication device to display the service characteristics in either a graphical display format, table format, and comparison formats. In comparison formats the graphical display 607 displays service characteristics of a plurality of communication pathways side by side. Further options provided by pressing the EVALUATE key 643 for more than 5 seconds are the service characteristic configurations, which may include an "evaluate and transfer" option. This option when set allows the voice communication device or the user to take transfer decisions based upon user set criteria such as manual, semi-automatic and automatic as described above.

HANDOFF key 647 allows the user to handoff between Internet and public switched telephone network communication pathways, either immediately or during a mid-call. Further, it allows Internet to public switched telephone network and public switched telephone network to Internet calls to occur when the supporting networks provide bridging. For example, user may select a telephone number of a remote terminal (or input manually the telephone number) and this telephone number is displayed on the display 607. Then, the user may lift the handset and press HANDOFF key 647. This allows the processing circuitry to set up a call using a public switched telephone network communication pathway and immediately handoff from public switched telephone network communication pathway to an Internet communication pathway. Similarly, if the HANDOFF key 647 is pressed during a mid-call, the mid-call handoff takes place during a dead zone.

In addition, pressing the HANDOFF key 647 for more than 5 seconds allows user to program the user preferences on an automatic handoff/transfer. In specific, when the HANDOFF key 647 is pressed for more than 5 seconds, the display 607 displays many options, in conjunction with the VOLUME/SCROLL keys 649 and 651. They are: (a) display 'enable automatic handoff/' option, enabling which allows the voice communication device to take automatic handoff decisions based upon user set criteria; (b) display 'enable automatic transfer' option, enabling which allows the voice communication device to transfer automatically to a communication pathway which meets preset service characteristics configurations; (b) display 'default mode Internet or public switched telephone network' option, that allows the user to prefer a default communication pathway between Internet and public switched telephone network; (c) display 'quality threshold setting' that allows the user to set a number between 0 to 9, 0 being the lowest quality threshold and 9 being the highest quality threshold; (d) display 'link cost considerations' that allows the user to set a cost preference by entering a number between 0 to 9, 0 being the lowest cost consideration and 9 being the highest cost consideration; and (e) display 'prompt before automatic handoff' option. However, once automatic handoff is enabled, the HANDOFF key 647 is disabled during the call and the user may not be able to manually switch from an Internet communication pathway to a public switched telephone network communication pathway or vice versa. An expanded keypad interface (not shown), in another embodiment, may contain individual keys for each numerals and alphabets.

Figure 7:
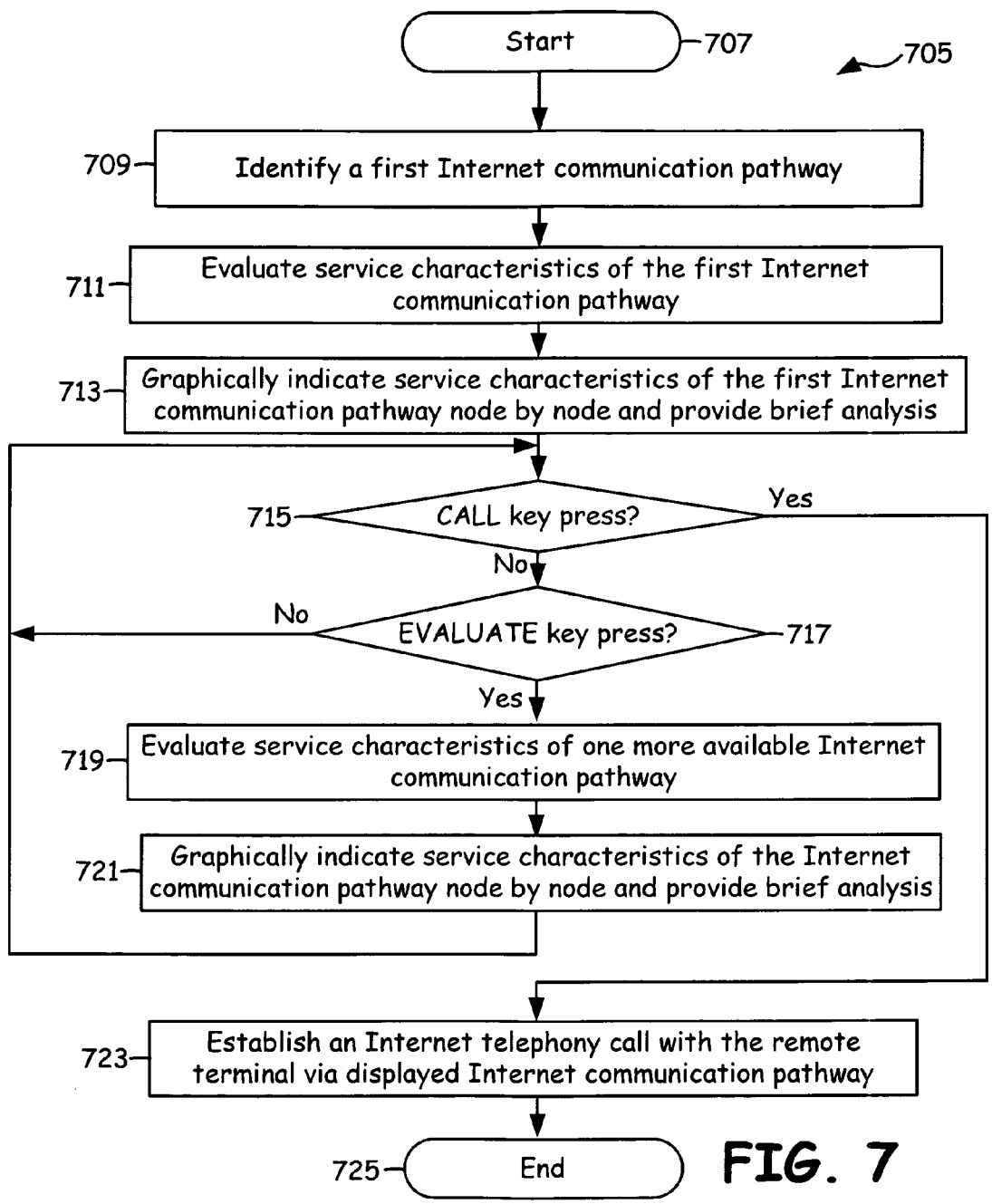
FIG. 7 is a flow diagram illustrating the method performed by a voice communication device that maintain communication quality, during an operation of evaluation of available Internet communication pathways and manual transfer to an available Internet communication pathway.

FIG. 7 is a flow diagram 705 illustrating the method performed by a voice communication device that maintain communication quality, during an operation of evaluation of available Internet communication pathways and manual transfer to an available Internet communication pathway. The figure illustrates a manual mode of transfer to a chosen communication pathway when the voice communication device service characteristics configuration settings are configured to transfer manually. The method of manual transfer starts at a block 707 when the user keys in IP address of a remote terminal and presses the EVALUATE key. The method of manual transfer illustrated 705 may also occur during a call with the remote terminal, if the user presses the EVALAUTE key during a call.

Then, at a next block 709, the voice communication device identifies an Internet communication pathway among a plurality of available Internet communication pathways. The identification of an Internet communication pathway itself is not necessarily based on any preset criteria, it may simply be a first available Internet communication pathway. If it is during a call on the other hand, the identified Internet communication pathway is one another pathway that is not being used for communication. Then at a next block 711, the voice communication device evaluates the service characteristics of the Internet communication pathway identified in the block 709. Then at a next block 713, the service characteristics and a brief analysis of the identified Internet communication pathway are displayed graphically.

Then at a next decision block 715, the voice communication device determines if a CALL key press has occurred through the user interface. If yes, an Internet call is established using the displayed communication pathway in a block 723. On the other hand, if the method 705 occurs during a call, a CALL key press in the block 715 transfers the call to the identified pathway in the block 723.

Then at a next decision block 717, the voice communication device determines if an EVALUATE key press has occurred. If yes, at a next block 719, the voice communication device identifies and evaluates the service characteristics of one more Internet communication pathway. Then at a next block 721, the service characteristics and a brief analysis of the Internet communication pathway identified in the block 719 is displayed graphically.

This process of identification of one more Internet communication pathway, displaying of service characteristics of the identified Internet communication pathway, waiting for a CALL key press and/or EVALUATE key press occurs in loop. This loop is broken when a CALL key press occurs and this allows the voice communication device to establish an Internet call using the identified Internet communication pathway in the block 723. The method ends at a next block 725.

Figure 8:
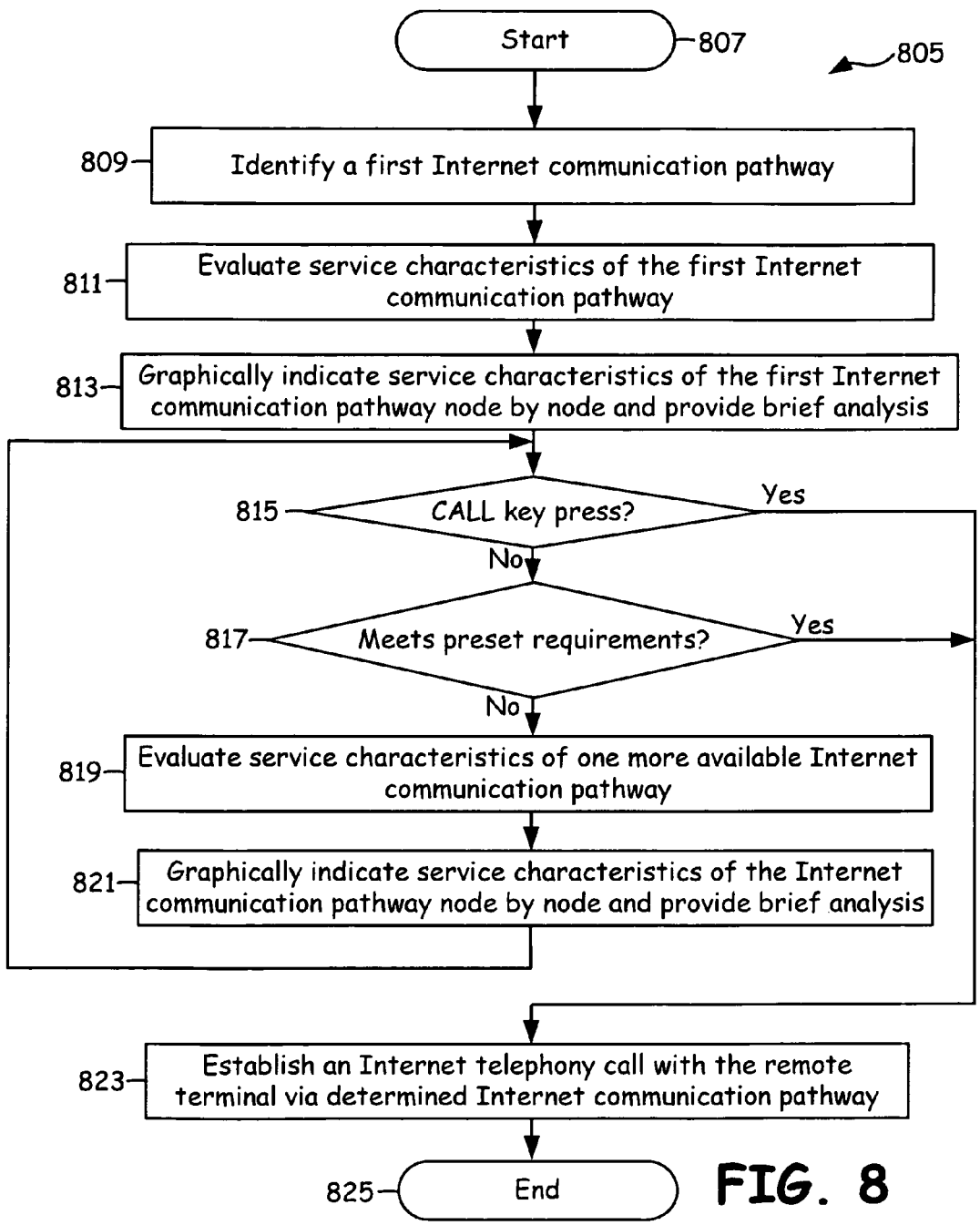
FIG. 8 is a flow diagram illustrating the method performed by a voice communication device that maintain communication quality, during an operation of evaluation of available Internet communication pathways and semi-automatic transfer to an available Internet communication pathway that meets preset service characteristic configuration settings.

FIG. 8 is a flow diagram 805 illustrating the method performed by a voice communication device that maintain communication quality, during an operation of evaluation of available Internet communication pathways and semi-automatic transfer to an available Internet communication pathway that meets preset service characteristic configuration settings. This figure illustrates a semi-automatic mode of transfer to a chosen communication pathway when voice communication device service characteristics configuration settings are configured to transfer semi-automatically. The method of semi-automatic transfer starts at a block 807 when the user keys in IP address of a remote terminal and presses the EVALUATE key. The method of semi-automatic transfer illustrated 805 may occur prior to a call or during a call, whenever the user chooses to press the EVALAUTE key.

Then, at a next block 809, the voice communication device identifies an Internet communication pathway among a plurality of available Internet communication pathways. The identification of a first Internet communication pathway is not necessarily based on any preset criteria. If the EVALUATE key press occurs during a call, the identified Internet communication pathway is another pathway that is not being presently used for communication. Then at a next block 811, the voice communication device evaluates the service characteristics of the Internet communication pathway identified in the block 809. Then at a next block 813, the service characteristics and a brief analysis of the identified Internet communication pathway are displayed graphically.

The semi-automatic transfer method follows a loop and allows the user to choose one among many available Internet communication pathways that meet preset service characteristic configurations. The loop begins at a next decision block 815, when the voice communication device waits for a CALL key press. If the CALL key is pressed after displaying the service characteristics of the first Internet communication pathway, the Internet voice call is established with the remote terminal via the first Internet communication pathway that is presented on the display in the block 813. The CALL key press may occur prior to or during a call.

If CALL key is not pressed at the decision block 815, at a next decision block 817, the voice communication device verifies if the first Internet communication pathway meets the preset service characteristics configurations. If yes, the voice communication device establishes an Internet voice call with the remote terminal via the first Internet communication pathway that is presented on the display in the block 813. If not, at a next block 819, the voice communication device identifies and evaluates the service characteristics of one more Internet communication pathway. Then at a next block 821, the service characteristics and a brief analysis of the Internet communication pathway identified in the block 819 is displayed graphically.

This loop of identification of one more Internet communication pathway, displaying of service characteristics of the identified Internet communication pathway, waiting for a CALL key press and determination of whether the preset configuration criteria are met by the identified Internet communication pathway repeats until all available pathways are evaluated. This loop is broken when a CALL key press occurs or when an Internet communication pathway that meets preset service characteristics is determined. This allows the voice communication device and/or the user to choose an Internet communication pathway that meets the preset service characteristics configurations and establish an Internet call using this Internet communication pathway in the block 823. The method ends at a next block 825.

Figure 9:
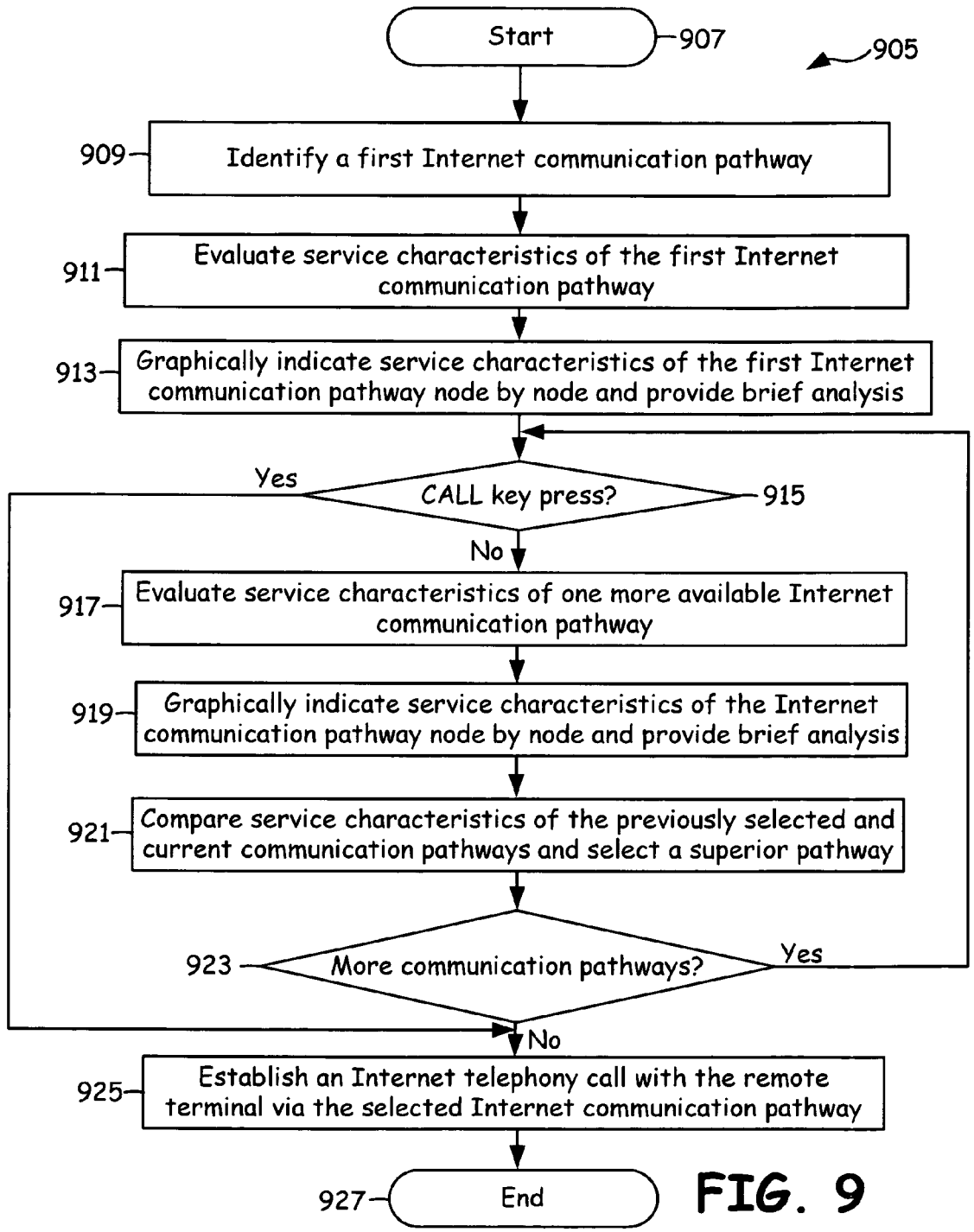
FIG. 9 is a flow diagram illustrating the method performed by a voice communication device that maintain communication quality, during an operation of evaluation of available Internet communication pathways and automatic transfer to a superior Internet communication pathway.

FIG. 9 is a flow diagram illustrating the method performed by a voice communication device that maintain communication quality, during an operation of evaluation of available Internet communication pathways and automatic transfer to a superior Internet communication pathway. This figure illustrates an automatic mode of transfer to a chosen communication pathway when voice communication device service characteristic configuration settings are configured to transfer automatically. Although this method is fully automatic in determining an Internet communication pathway, the method still allows the user to intervene in the process by pressing the CALL key any time. This method starts at a block 907 when the user keys in IP address of a remote terminal and presses the EVALUATE key. The method of automatic transfer illustrated 905 may occur prior to a call or during a call, whenever the user chooses to press the EVALAUTE key.

Then, at a next block 909, the voice communication device identifies an Internet communication pathway among a plurality of available Internet communication pathways. The identification of a first Internet communication pathway is not necessarily based on any preset criteria. If the EVALUATE key press occurs during a call, the identified Internet communication pathway is another pathway that is not being presently used for communication. Then at a next block 911, the voice communication device evaluates the service characteristics of the Internet communication pathway identified in the block 909. Then at a next block 913, the service characteristics and a brief analysis of the identified Internet communication pathway are displayed graphically.

Then at a next decision block 915, the voice communication device determines if a CALL key press occurs at the user interface. If yes, an Internet voice call is established with the remote terminal via the first Internet communication pathway that is presented on the display in the block 913. The CALL key press may occur prior to or during a call. If CALL key is not pressed at the decision block 915, at a next decision block 917, the voice communication device identifies and evaluates the service characteristics of one more Internet communication pathway. Then at a next block 919, the service characteristics and a brief analysis of the Internet communication pathway identified in the block 917 is displayed graphically. Then at a next block 921, the voice communication device compares the service characteristics of the current Internet communication pathway with that of a previous Internet communication pathway with highest quality of service and further considers the cost of the Internet communication pathways using an algorithm in this comparison.

In the next decision block 923, the voice communication device determines if there are more Internet communication pathways available. If yes, the loop repeats from blocks 915, 917, 919 to 921. The automatic transfer method thus follows a loop of automatically identifying one more Internet communication pathway, evaluating the service characteristics of the communication pathway comparing the service characteristics of the current Internet communication pathway with the best of the previously evaluated Internet communication pathways until all available communication pathways are explored. Then the voice communication device picks an Internet communication pathway with highest quality of service and based upon cost considerations, among available Internet communication pathways and establishes the communication with this Internet communication pathway. The user may interrupt this process any time by pressing the CALL key. If no more Internet communication pathways are available at the decision block 923 or no CALL key press occurs at the decision block 915 before all available communication pathway are exhausted, then at a next block 925, an Internet voice call is established an Internet communication pathway that is determined in the block 921.

Figure 10:
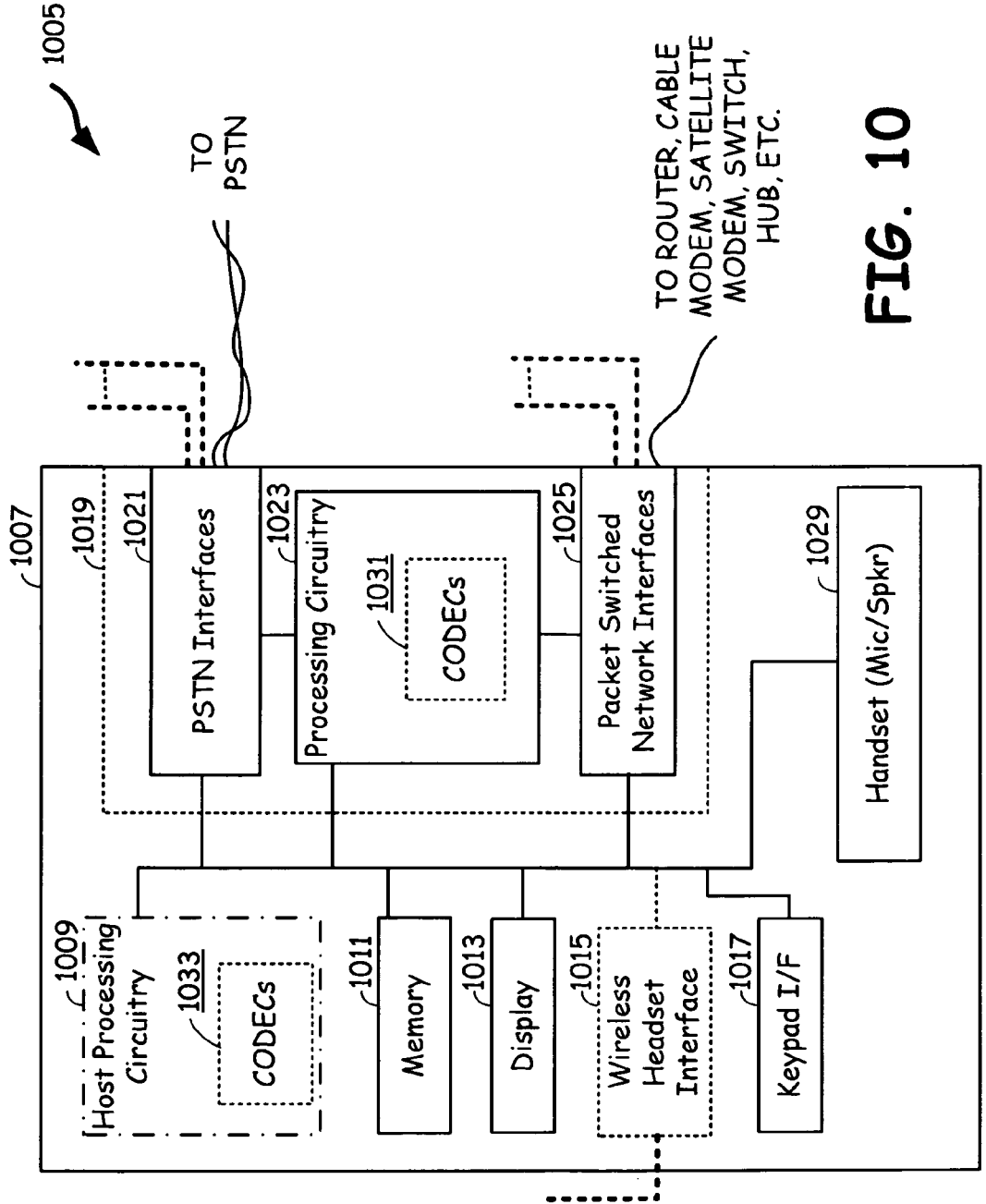
FIG. 10 is a block diagram illustrating a voice communication device constructed in accordance with the embodiments of FIGS. 1, 2 and/or 3 of the present invention, in which Coder-DECoders (CODECs) are part of processing circuitries.

FIG. 10 is a block diagram 1005 illustrating a voice communication device constructed in accordance with the embodiments of FIGS. 1, 2 and/or 3 of the present invention, in which COder-DECoders (CODECs) are part of processing circuitries. The functional blocks of a voice communication device 1007 shown illustrate an alternative embodiment to the one shown in FIG. 5. The voice communication device 1007 consists of CODECs 1031 and 1033, which are embedded as a part of processing circuitries 1023 and 1009 respectively. In some simpler version of the voice communication devices, the host processing circuitry 1009 may be combined with the processing circuitry 1023 as well. Instead of a single set of packet switched network and public switched telephone interfaces shown in FIG. 5, the embodiment shown here consists of a plurality of packet switched network and public switched telephone interfaces. The voice communication device 1007 illustrated supports both Internet and public switched telephone network telephony, and may correspond at least in part to any of the voice communication devices herein. In other embodiments, the voice communication device of the present invention may include fewer or more components than are illustrated as well as lesser or further functionality. In other words, the illustrated voice communication device is meant to merely offer one more example of possible functionality and construction in accordance with the present invention.

The voice communication device 1007 generally includes host processing circuitry 1009, memory 1011, display 1013, optional wireless headset interface 1015, keypad interface 1017, handset 1029, and a plurality of communication interfaces 1019. These components communicatively coupled to one another via one or more of a system bus, dedicated communication pathways, or other direct or indirect communication pathways. Host processing circuitry 1009 may be, in various embodiments, a microprocessor, a digital signal processor, a state machine, an application specific integrated circuit, a field programming gate array, or other processing circuitry. Memory 1011 may be random access memory, read-only memory, flash memory, a disk drive, an optical drive, or another type of memory that is operable to store computer instructions and data. Display 1013 may be a conventional LCD display, an LED display, a touch based display, or another display. Wireless headset interface 1015 may be a WPAN interface such as a Bluetooth interface, a proprietary wireless headset interface, or another wireless interface. Handset 1029 enables a user to interact with the components of the bridging telephone and includes a speaker and a microphone. Keypad interface 1017 enables the user to communicate with the bridging telephone via keystroke inputs. The handset 1029 may be movable with respect to the rest of the components of the voice communication device. In other embodiments, the handset may be replaced by a microphone and a speaker. Such is the case when the voice communication device comprises a wireless telephone.

Communication interfaces 1019 includes a public (circuit) switched telephone network interface 1021, processing circuitry 1023 and packet switched network interfaces 1025. The public switched telephone network interfaces 1021 support both a wired and wireless link to public switched telephone networks (i.e., supports links to cellular) and wired PSTN networks, and may be associated with a plurality of public switched telephone network service providers. The packet switched network interfaces 1025 wired or wirelessly couple to the packet switched networks such as intranet and Internet networks as previously described with reference to FIGS. 1, 2 and 3 and may be supported by a plurality of Internet/Intranet service providers. Generally, the components of the voice communication device 1007 work to determine service characteristics of the various communication pathways for selection and transfer/handoff. Multiple pathways may originate from a single communication interface due to pathway divergence immediately outside of the voice communication device or at any other point along the pathway. For example, one of the communication interfaces 1025 might provide wireless communication to two or more access points via communication paths that at some point converge either on a common portion of a node in the pathway or on the destination voice communication device itself. The communication interfaces 1025 might also have wired access to yet another access point that similarly converges. Other pathways that may be independent or share common portions or nodes are provided by the PSTN interfaces 1021. Alternatively, each of the plurality of communication interfaces 1019 may provide a plurality of communication pathways via a plurality of service providers and the components of the voice communication device 1007 may work together to determine service characteristics of the various communication pathways that emerge, for selection and transfer/handoff.

As described with reference to the FIG. 5, by analyzing all of these pathways to gather or generate service characteristics and sum up overall link costs, the processing circuitry 1023 can select a pathway for call setup. Thereafter, during the call session, the processing circuitry 1023 may monitor service characteristics of the present and potential pathways to service automatic, automated (with user prompting/authorization), or manually initiated handoff. The processing circuitry 1023 and/or 1009 determines service characteristics of an Internet communication pathway by performing analysis of the Internet communication pathway and obtaining usage cost/second from the service provider. The analysis of Internet communication pathway may be performed by sending an Internet Control Message Protocol Echo Request Packets to analyze the Internet communication pathway to the recipient voice communication device, receiving echo reply, and analyzing the echo reply. The processing circuitry 523 and/or 509 may also request the servers of the service providers to analyze the Internet communication pathway, if programmed to do so. Service characteristics of PSTN pathways may be generated by the processing circuitry 1023 and/or 1009 or retrieved from local memory or from any network node. Such service characteristics are scaled for comparison with Internet service characteristics, for example, by generating a QOS factor for such PSTN pathways or pathway portions for comparison to QOS factors for Internet pathways or pathway portions. Along with such QOS factors, costing information for each pathway, whether PSTN or Internet in whole or in part, can be calculated.

Test packets such as the ICMP echo request packets, may be sent by the processing circuitry 1023 before call setup, separate of voice data packets during mid-call, with voice data packets during mid-call, separate of voice data packets during mid-call and/or with voice data packets during mid-call, for example. Further, after initial transmission and determination of a communication pathway the echo request packets may also be sent periodically, for example, once for every hundred voice data packets. Further, the Internet communication pathways may be analyzed based upon user input via user interface. Alternatively, the echo request packets may be sent only when a dead voice data packet is detected by the CODECs 1031 and/or 1033 embedded in the processing circuitries 1023 and/or 1009.

FIG. 11 is a block diagram 1105 illustrating typical communication pathways through which the voice packets that emanate from voice communication devices that maintain communication quality traverse, while communicating via mixed communication pathways of Internet and PSTN backbones. The illustration 1105 shows detailed structures of Internet backbone 1125 and PSTN backbone 1135. The Internet backbone 1125 may consist of nodes (routers and switches) such as the routers 1115, 1117, 1119, 1121, 1123, 1127, 1129 and 1131. Further, the illustration also shows a PSTN backbone 1135, in which only two InterXChange (IXC) carriers A, B 1141, 1143 are shown. These IXC carriers communicatively couple various exchanges via satellite, fibre-optic, cable or terrestrial microwave networks. The illustration also shows two voice communication devices 1107 (103 in FIG. 1) and 1109 (107 in FIG. 1) that may exchange voice/data information while the users are in communication or during service characteristics analysis. The voice/data communication between voice communication devices 1107 and 1109 may take place via an Access Point (AP) 1111, Internet Service Provider's Network (ISPN) 1113, Internet backbone 1125, bridges(s) 1133, PSTN backbone 1135, bridge(s) 139 and cellular Service Provider's (SP) network 1139.

During the exchange of voice/data information between the two voice communication devices 1107 and 1109, there may appear many possible reasons for the deterioration of the quality of information exchange. The routers 1115, 1117, 1119, 1121, 1123, 1127, 1129 and 1131 may introduce both delay due to network congestions (during peak hours for example) and errors in reproduction of voice packets (dead packets) due to noise in a communication pathway segment or routers themselves (as discussed with reference to the FIG. 5). Further, the noise may cause deterioration of signal quality in the bridges 1133 and 1137. The PSTN communication backbone 1135 may introduce noise during the switching operation or during signal transmission between IXCs A and B 1141 and 1143. The access point 1111 and ISPN 1113 may also introduce errors during transmission. Finally, the cellular SP network(s) 1139 may also introduce noise during exchange of information.

In addition to the above mentioned mixed pathway, the information exchange may also occur along asymmetric paths (half-duplex) or along a plurality of communication pathways. For example, the telephony call pathway from a voice originating device might originate from via the Internet network and bridge into public switched telephone network to the voice destination device. At the same time, a supplemental information pathway supporting such telephony call could exist with an end-to-end Internet pathway between the calling and receiving phones. Alternatively, a call originating via the Internet network and bridged into the public switched telephone network to the receiving phone might be used for the call with the supplemental pathway, if used, being end-to-end Internet.

Although the supplemental pathway as described above does not carry the call itself, this need not be the case. Instead, the call pathway and supplemental pathways may work together to support the call exchange. For example, the calling phone pathway to the receiving phone (half-duplex) may involve an end-to-end public switched telephony pathway. At the same time, the other "half" of the call from the receiving phone to the calling phone might pass through an end-to-end Internet telephony pathway. In addition, the end-to-end Internet pathway could be used for other supplemental information exchange beyond the call itself. Other alternative sharing of the call exchange duties could be split across the call pathway and supplemental pathway. For example, audio call information might flow through one path while video call information takes the other, or background music audio might take one pathway, while the other is used for the voice audio.

For example, the voice-originating device may be the voice communication device 1107. In this case, the voice communication device 1107 initiates service characteristics analysis by sending echo request packets either automatically or based upon manual initiation via user interface of the voice communication device 1107. Both ISPN such as 1113 and PSTN service providers such as 1139 support the service characteristics analysis of mixed and plurality of pathways. For example, an echo request packet originating from the voice originating device 1107 may receive an echo reply from various elements of the Internet networks such as AP 1111, ISPN 1113 and routers in Internet backbone 1125. Thereafter, the echo request packets enter the domain of PSTN networks such as bridges(s) 1133 and 1137, PSTN backbone 1135 and 1139. Here, the PSTN networks, in response to an echo request packet, send a modulated signal such as a "zero tone signal" and expect a response from various elements through which the information travel including the voice destination device 1109. These replies are analyzed by the voice originating device and a graphical display of service characteristics analysis might be provided via display to the user.

The service characteristics analysis (and transferring the call pathway if found necessary) is also applicable when referring to the supplemental pathway. For example, a call might be established such that the call itself (i.e., the voice and possibly video captured as part of the caller to recipient interaction and exchange) is split across two (or more) pathways (either different half-duplex pathways, different call portion pathways, or a combination of both). In these mixed pathway situations also, an overall error rate or quality of service rating is presented to the user via display. Further, a prospective time stamp indication in the echo reply along the various elements of the mixed pathways mentioned above and a clock synchronization between voice originating device, voice destination device and various elements of the communication pathway may provide a simpler means to analyze service characteristics.

As one of average skill in the art will appreciate, the term "communicatively coupled", as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A communication device comprising:
   a user interface;
   a plurality of communication interfaces; and
   processing circuitry communicatively coupled to the user interface and to the plurality of communication interfaces, the processing circuitry operable to:
   identify a wireless communication pathway serviced by the plurality of communication interfaces and a wired communication pathway serviced by the plurality of communication interfaces;
   perform an analysis of the wireless communication pathway and the wired communication pathway to determine a first service characteristic of the wireless communication pathway and a second service characteristic of the wired communication pathway, serviced by the plurality of communication interfaces;
   automatically and without user input, establish a media session for communicating media other than voice with a remotely located terminal via the wireless communication pathway based on the first service characteristic and the second service characteristic;
   repeat the analysis of the wireless communication pathway and the wired communication pathway to determine an additional first service characteristic and an additional second service characteristic; and
   automatically and without user input, transfer service of the media session from the wireless communication pathway to the wired communication pathway based on the additional first service characteristic and the additional second service characteristic;
   wherein each of the first service characteristic and the second service characteristic comprises a media quality provided by the respective communication pathway.

2. The communication device of claim 1, wherein the plurality of communication interfaces includes a first packet switched network interface that supports Internet telephony.

3. The communication device of claim 1, wherein the plurality of communication interfaces includes a wireless interface that supports wireless telephony.

4. The communication device of claim 1, wherein the plurality of communication interfaces includes a public switched telephone network interface that supports public switched telephone network telephony.

5. The communication device of claim 1, wherein each of the first service characteristic and the second service characteristic comprises a cost of usage of the respective communication pathway calculated by the processing circuitry.

6. The communication device of claim 1, wherein the first service characteristic comprises a wireless interface signal strength.

7. The communication device of claim 1, wherein the first service characteristic is provided to the user via the user interface.

8. The communication device of claim 1, wherein the second service characteristic is provided to the user via the user interface.

9. The communication device of claim 1, wherein determining the first service characteristic and the second service characteristic includes sending a respective path evaluation request via the wireless and wired communication pathways and receiving a respective path evaluation response.

10. The communication device of claim 1, wherein determining the first service characteristic and the second service characteristic includes characterization of the respective path delay of packets received via the wireless communication pathway and the wired communication pathway.

11. A method for evaluation of service characteristics of a plurality of communication pathways and utilize service of a selected communication pathway, by a communication device, the method comprising:
   evaluating the service characteristics of a wireless communication pathway by performing an analysis of the wireless communication pathway;
   evaluating the service characteristics of a wired communication pathway by performing an analysis of the wired communication pathway;
   automatically and without user input, setting up a media session for communicating media other than voice with a remote terminal via a selected one of the wireless communication pathway and the wired communication pathway based upon the service characteristics of the wireless communication pathway and the wired communication pathway;
   repeating the evaluating of the wireless communication pathway and the wired communication pathway to determine additional service characteristics thereof; and
   automatically and without user input, transferring the media session to the other of the wireless communication pathway and the wired communication pathway based upon the additional service characteristics of the wireless communication pathway and the wired communication pathway;
   wherein the service characteristics comprise a media quality provided by the wireless communication pathway and the wired communication pathway.

12. The method of claim 11, wherein evaluating the service characteristics further includes:
   sending a path evaluation request via the wireless communication pathway;
   receiving a path evaluation response via the wireless communication pathway;
   sending a path evaluation request via the wired communication pathway; and
   receiving a path evaluation response via the wired communication pathway.

13. The method of claim 12, wherein sending path evaluation request comprising identifying propagation times for packet flow through each node of each of the communication pathways.

14. The method of claim 11, wherein transferring to the other of wireless communication pathway and the wired communication pathway is based upon:
   comparison of the service characteristics between the wireless communication pathway and the wired communication pathway before service; and
   comparison of the additional service characteristics between the wireless communication pathway and the wired communication pathway during the media session.

15. The method of claim 11, wherein preset service characteristic configurations comprising quantifying and storing of:
   quality of service of a media session; and
   cost of usage via each of the communication pathways per a unit of time.

16. The method of claim 11, further comprising:
   providing the service characteristics of the wireless communication pathway to a user of the communication device.

17. The method of claim 11, further comprising:
   providing the service characteristics of the wired communication pathway to a user of the communication device.

18. The method of claim 11, wherein the service characteristics further include a respective cost of usage of each of the wireless communication pathway and the wired communication pathway.

19. The method of claim 11, wherein the service characteristics of the wireless communication pathway further includes a wireless interface signal strength.

20. The method of claim 11, wherein the wired communication pathway includes a public switched telephone network pathway or an Internet pathway.

* * * * *